United States Patent
Jang et al.

(10) Patent No.: US 11,936,337 B2
(45) Date of Patent: Mar. 19, 2024

(54) DC-DC CONVERTER FOR SOLAR-RELATED ENERGY STORAGE SYSTEM, AND CONTROL METHOD THEREOF

(71) Applicant: LG INNOTEK CO., LTD., Seoul (KR)

(72) Inventors: Ju Young Jang, Seoul (KR); Jeong Heum Lee, Seoul (KR); Soo Hong Kim, Seoul (KR); Ui Seon Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 698 days.

(21) Appl. No.: 17/054,454

(22) PCT Filed: Aug. 17, 2018

(86) PCT No.: PCT/KR2018/009427
§ 371 (c)(1),
(2) Date: Nov. 10, 2020

(87) PCT Pub. No.: WO2019/231047
PCT Pub. Date: Dec. 5, 2019

(65) Prior Publication Data
US 2021/0234506 A1     Jul. 29, 2021

(30) Foreign Application Priority Data

Jun. 1, 2018 (KR) .................. 10-2018-0063196
Jun. 1, 2018 (KR) .................. 10-2018-0063197

(51) Int. Cl.
*H01M 10/44*     (2006.01)
*H01M 10/46*     (2006.01)
(Continued)

(52) U.S. Cl.
CPC .............. *H02S 40/38* (2014.12); *H02J 3/381* (2013.01); *H02J 7/00714* (2020.01); *H02J 7/007182* (2020.01); *H02J 2300/24* (2020.01)

(58) Field of Classification Search
CPC ............ H02J 7/00714; H02J 7/007182; H02J 7/0034; H02J 2300/24; H02J 3/381; H02H 11/002; H02S 40/38
(Continued)

(56) References Cited

U.S. PATENT DOCUMENTS 9,356,456 B2 *  5/2016  Fukada .................. H02J 7/0013
9,641,021 B2 *  5/2017  Gong ........................ H02J 7/35
(Continued)

FOREIGN PATENT DOCUMENTS

CN        105896623 A       8/2016
CN        106300393 A       1/2017
(Continued)

*Primary Examiner* — Edward Tso
(74) *Attorney, Agent, or Firm* — Birch, Stewart, Kolasch & Birch, LLP

(57) ABSTRACT

One embodiment discloses a DC-DC converter which, in a solar-related energy storage system, cuts-off the over-discharging of a battery, and a control method thereof. Specifically, disclosed are a DC-DC converter which protects a battery by appropriately switching between a sleep mode which minimizes battery consumption by maintaining only minimized functions and a cut-off mode which prevents the battery from over-discharging by physically cutting off a circuit connected to the battery, and a control method thereof. Also, an embodiment discloses a DC-DC converter or reverse wiring protection device for between a solar panel and a battery. Specifically, disclosed is a DC-DC converter or reverse wiring protection device comprising: a reverse current pass circuit comprising a current sensor, a voltage sensor, a diode and a fuse; a breaker circuit which cuts-off the supply of power if reverse wiring is sensed by the current sensor or the voltage sensor; a capacitor which is connected in parallel to the reverse current pass circuit; and a switch which connects the reverse current pass circuit and the battery pack.

20 Claims, 19 Drawing Sheets

(51) Int. Cl.
    *H02J 3/38*     (2006.01)
    *H02J 7/00*     (2006.01)
    *H02S 40/38*     (2014.01)

(58) Field of Classification Search
    USPC ....... 320/101, 127, 128, 132, 134, 136, 152,
                   320/162, 165; 361/78, 79, 82, 88, 93.1
    See application file for complete search history.

(56) References Cited

U.S. PATENT DOCUMENTS

| | | | |
|---|---|---|---|
| 9,800,085 B2 * | 10/2017 | Kim | ................. H02J 7/35 |
| 2008/0197815 A1 | 8/2008 | Liebstueckel et al. | |
| 2013/0082645 A1 * | 4/2013 | Fukada | ................. H02J 7/0013 |
| | | | 320/107 |
| 2013/0113427 A1 | 6/2013 | Noda | |
| 2016/0204649 A1 * | 7/2016 | Kim | ................. H02J 7/35 |
| | | | 320/101 |
| 2016/0211678 A1 | 7/2016 | Tsurumaru et al. | |

FOREIGN PATENT DOCUMENTS

| | | |
|---|---|---|
| DE | 10 2010 020 294 A1 | 8/2011 |
| EP | 2 899 825 A1 | 7/2015 |
| JP | 2013-132156 A | 7/2013 |
| KR | 10-2010-0038956 A | 4/2010 |
| KR | 10-2013-0007258 A | 1/2013 |
| KR | 10-2016-0027499 A | 3/2016 |
| KR | 10-2017-0127245 A | 11/2017 |
| WO | WO 2015/040722 A1 | 3/2015 |

\* cited by examiner

DC-DC CONVERTER FOR SOLAR-RELATED ENERGY STORAGE SYSTEM, AND CONTROL METHOD THEREOF

CROSS REFERENCE TO RELATED APPLICATIONS

This application is the National Phase of PCT International Application No. PCT/KR2018/009427, filed on Aug. 17, 2018, which claims priority under 35 U.S.C. 119(a) to Patent Application No. 10-2018-0063196, filed in the Republic of Korea on Jun. 1, 2018 and Patent Application No. 10-2018-0063197, filed in the Republic of Korea on Jun. 1, 2018, all of which are hereby expressly incorporated by reference into the present application.

TECHNICAL FIELD

In the present disclosure, a DC-DC converter and a control method thereof which cut-off the over-discharging of a battery in a solar-related energy storage system are disclosed.

In addition, in the present disclosure, a DC-DC converter and a control method thereof comprising a protection device for protecting a circuit when a reverse wiring between a solar panel and a battery occurs are disclosed.

BACKGROUND ART

Recently, as awareness of environmental protection has been increased, interest in a method of generating electricity without discharging pollutants such as carbon dioxide has been emerged. In particular, in the case of a power generation system using solar light, the development and installation cost of the technology becomes cheaper powered by the technological advancement, and the supply is gradually expanding.

In such a solar power generation system, a plurality of solar cells is assembled to form a plurality of photovoltaic modules. The DC power generated from the plurality of solar cell modules is converted to AC power through an inverter, and thus, it can be immediately used in industrial facilities.

Meanwhile, in the case of solar power generation, a gap in power generation, during which sufficient power generation is not achieved due to night time when solar light is unavailable or changes in weather, occurs inevitably. Therefore, in order to compensate for such disadvantages, a solar power generation system is essentially equipped with a battery to enable stable power supply.

However, in the case of a battery, when an over-discharging occurs due to the solar power generation environment and electricity consumption, a case of unrecoverable damage occurs. Therefore, many efforts have been made to prevent over-discharging of the battery in an energy storage system related to a solar power generation system.

In addition, in the case of such a battery, when installed in a solar power generation system, a case where DC polarities are confusedly installed often occurs. In this case, not only a product damage problem such as a burnout damage of an internal device may occur, but also the safety of workers may be threatened. Accordingly, much effort has been made to protect the circuit of the solar (power generation) system even if a reverse wiring occurs due to DC polarity confusion during battery installation.

DETAILED DESCRIPTION OF THE INVENTION

Technical Subject

The present disclosure may disclose a DC-DC converter which, in a solar-related energy storage system, cuts-off the over-discharging of a battery, and a control method thereof. Specifically, disclosed are a DC-DC converter which protects a battery by appropriately switching between a sleep mode which minimizes battery consumption by maintaining only minimized functions and a cut-off mode which prevents the battery from over-discharging by physically cutting off a circuit connected to the battery, and a control method thereof. Of course, the technical problem to be solved is not limited to the technical problems as described above, and various technical problems may be further included within the scope that is apparent to a person skilled in the art.

In addition, the present disclosure can provide a reverse wiring protection device and method capable of cutting off power by detecting a reverse wiring to a DC-DC converter of a battery for a solar power generation system. Specifically, a reverse wiring protection device for cutting off a power supply by sensing a connection line from a current sensor or a voltage sensor is disclosed. The technical problem to be solved is not limited to the technical problems as described above, and various technical problems may be further included within a scope that is apparent to a person skilled in the art. For example, a reverse wiring protection device may be included in a DC-DC converter.

Technical Solution

A DC-DC converter according to the first aspect may comprise: an input unit that receives power; an output unit that converts the power of the input unit and supplying it to a battery; a processor that determines a mode according to a state of the battery; and a circuit breaker that electrically connects to or disconnects from the battery according to the mode, wherein the processor measures a first remaining amount value of the battery in a first operation mode, the first operation mode is switched to a sleep mode when the first remaining amount value is less than or equal to a first value, the second operation mode is switched from the sleep mode to a second operation mode to measure a second remaining amount value of the battery, the second operation mode is switched to a cut-off mode when the second remaining amount value is less than or equal to a second value, and the circuit breaker may electrically separate the battery from the output unit in the cut-off mode of the processor.

Also, the second value may be smaller than the first value.

In addition, in the second operation mode, it may be switched to the sleep mode when the second remaining amount value of the battery is greater than the second value and less than or equal to the first value.

In addition, in the first operation mode, the DC-DC converter may be switched to the cut-off mode when the first remaining amount value of the battery is less than or equal to the second value.

In addition, in the second operation mode, the DC-DC converter may be switched to the first operation mode when the second remaining amount value of the battery is greater than the first value.

In addition, the sleep mode can reduce power consumption by deactivating functions other than a function required for communication with an inverter among a plurality of functions activated in the first operation mode.

In addition, the processor is switched to the first operation mode and can supply power to the battery when the current state is a state in which the battery can be charged through communication with the inverter while the battery is operating in the sleep mode or the cut-off mode.

In addition, the processor may determine the current state as a state in which the battery can be charged when more than a predetermined amount of power is supplied from the solar power supply.

In addition, the processor may switch the state of the circuit breaker in cut-off state into a connected state to supply power to the battery when the current state is a state in which the battery can be charged while operating in the cut-off mode.

In addition, the processor may switch from the sleep mode to a second operation mode according to a preset time interval.

In addition, the second value may be a remaining amount value of the battery when the displayed remaining amount value of the battery is 0.

In addition, the second operation mode may be a mode in which at least one of an analog-digital converter (ADC) sensing function, a pulse width modulation (PWM) function, and a protection function is deactivated.

In addition, a method for controlling a DC-DC converter according to a second aspect may comprise the steps of: determining a first remaining amount value of a battery in a first operation mode; switching the first operation mode to a sleep mode when the first remaining amount value is less than or equal to a first value; switching from the sleep mode to a second operation mode and measuring a second remaining amount of the battery; switching the second operation mode to a cut-off mode when the second remaining amount value is less than or equal to a second value; and electrically separating the battery, wherein the second value may be smaller than the first value.

In addition, the third aspect can provide a computer-readable recording medium in which a program for executing the method of the second aspect on a computer is recorded.

A DC-DC converter according to a fourth aspect may comprise: a current sensor; a voltage sensor; a reverse current pass circuit comprising a diode and a fuse; a cutoff circuit that cuts-off power supply when a reverse wiring is sensed from the current sensor or the voltage sensor; a capacitor connected in parallel with the reverse current pass circuit; and a switch connecting the reverse current pass circuit and a battery pack.

In addition, it may further comprise the battery pack connected in parallel with the reverse current pass circuit.

In addition, the battery may comprise at least one of a converter, a battery pack, a battery management system (BMS), and a battery control circuit. The switch may be opened when the battery is in a sleep mode.

In addition, the switch may further comprise a first line comprising a first FET and a resistor connected in series with the first FET, and a second line connected in parallel with the first line and comprising a second FET.

Also, the sleep mode may be activated when a state of charge (SOC) of a battery included in the battery pack is less than or equal to a preset value.

In addition, the capacitor may pass a reverse current according to the reverse wiring in parallel with the reverse current pass circuit.

In addition, the diode may be disposed in a direction in which the reverse current can flow.

In addition, the capacity of the fuse may correspond to the rated power applied to the DC-DC converter.

In addition, the current sensor may determine whether it is a reverse wiring based on the amount of change per time of the magnitude of the current.

In addition, the voltage sensor may determine whether it is a reverse wiring based on the amount of change per time of the magnitude of the voltage.

In addition, a DC-DC converter control method according to a fifth aspect may comprise the steps of: sensing a current by a current sensor; sensing a voltage by a voltage sensor; passing a reverse current through a reverse current pass circuit comprising a diode and a fuse; passing the reverse current through a capacitor connected in parallel with the reverse current pass circuit; and cutting off power supply when a reverse wiring is sensed from the current sensor or the voltage sensor.

In addition, the sixth aspect can provide a computer-readable recording medium in which a program for executing the method of the fifth aspect on a computer is recorded.

Advantageous Effects

The present disclosure may provide a DC-DC converter that protects the battery by appropriately switching a sleep mode that minimizes consumption of a battery by maintaining only a minimized function and a cut-off mode that prevents over-discharging of the battery by physically cutting off the circuit connected to the battery, and a control method thereof.

In addition, the present disclosure can provide a reverse wiring protection device and method capable of cutting off power by detecting a reverse wiring to a DC-DC converter of a battery for a solar power generation system.

BEST MODE

As for terms used in the embodiments, general terms that are currently widely used as possible are selected while considering functions in the present invention, but this may vary according to the intention of a technician working in the art or precedent, the emergence of new technologies, and the like. In addition, in certain cases, there are terms arbitrarily selected by the applicant, and in this case, the meaning of the terms will be described in detail in the description of the corresponding invention. Therefore, the terms used in the present invention should be defined based on the meaning of the term and the overall contents of the present invention, not a simple name of the term.

When a certain part of the specification is said to "comprise" a certain element, it means that other elements may be further included rather than excluding other elements unless specifically stated to the contrary. In addition, the terms " . . . unit", " . . . module", and the like refer to a unit that processes at least one function or operation, which may be implemented as hardware or software, or a combination of hardware and software.

Hereinafter, embodiments of the present invention will be described in detail with reference to the accompanying drawings so that an ordinary person skilled in the art may easily implement the present invention. However, the present invention may be implemented in various different forms and is not limited to the embodiments described herein.

Hereinafter, exemplary embodiments of the present invention will be described in detail with reference to the drawings.

Figure 1:
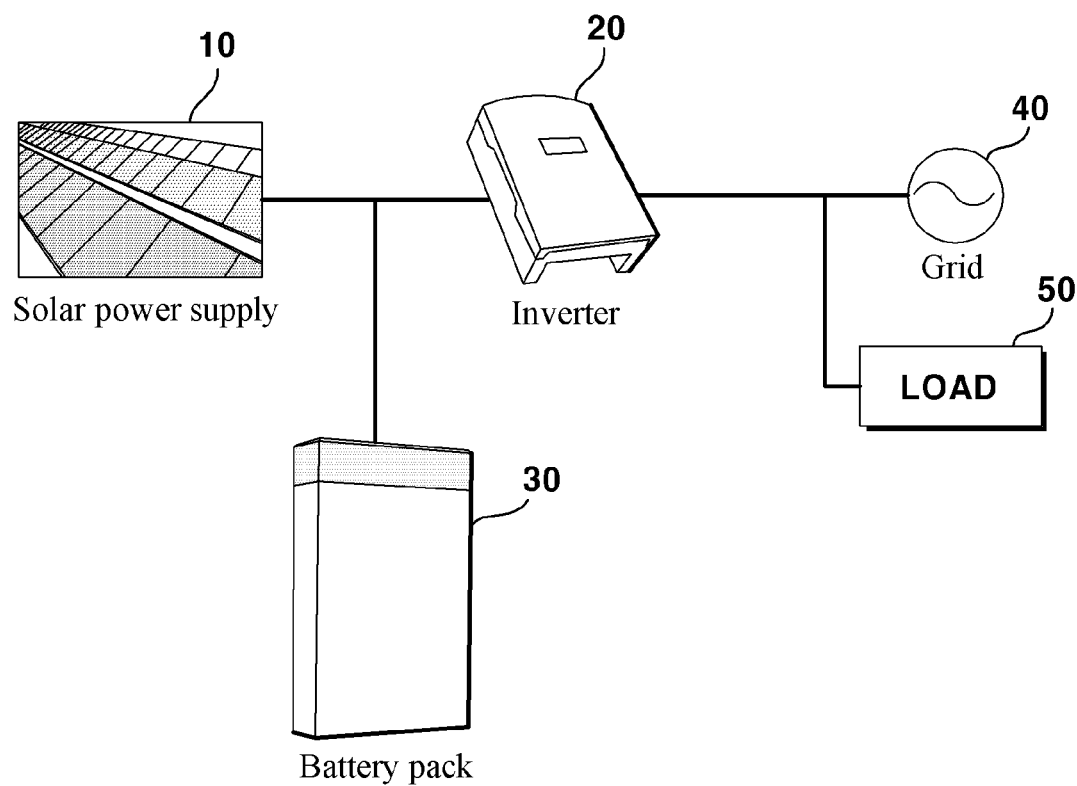
FIG. 1 is a diagram illustrating a solar-related energy storage system according to an embodiment.

FIG. 1 is a diagram illustrating a solar power generation system according to an exemplary embodiment. The solar-related energy storage system may be an example of a solar power generation system.

As illustrated in FIG. 1, the solar power generation system may comprise a solar power supply 10, an inverter 20, a battery pack 30, and a load 50.

However, it can be understood by an ordinary person skilled in the art that other general-purpose components other than the components shown in FIG. 1 may be further included in the solar power generation system. For example, the solar power generation system may further comprise a power grid, 40. Alternatively, according to another embodiment, it may be understood by an ordinary person skilled in the art that some of the components illustrated in FIG. 1 may be omitted.

The solar power supply 10 according to an embodiment may be composed of a plurality of photovoltaic modules in which photovoltaic cells are assembled, and a photovoltaic cell formed by bonding a p-type semiconductor and an n-type semiconductor generates electricity with light. Specifically, when a light is irradiated on a photovoltaic cell, electrons and holes are generated therein. The generated charges are moved to the P and N poles, respectively, and by this action, a potential difference occurs between the P and N poles, and at this time, when a load is connected to the photovoltaic cell a current flows. Here, the photovoltaic cell refers to the smallest unit that generates electricity, and the photovoltaic cells are gathered to form a photovoltaic module, and the photovoltaic module may form an array connected in series/parallel to form a solar power supply 10.

In order to supply a power to the power grid 40 or the load 50, the inverter 20 according to an embodiment may convert a direct current (DC) power generated by the solar power supply 10 by the photoelectric effect to an alternating current (AC) power. Here, the power grid 40 may refer to a grid for transmitting and distributing power produced by the solar power generation system. Meanwhile, the amount of power generated by the solar power supply 10 is continuously changed by temporal factors such as sunrise and sunset, or external factors such as weather and the like. Therefore, the inverter 20 controls the voltage generated from the solar power supply 10 to find the maximum power and supply it to the power grid 40. At this time, when a case occurs in that the power for operating the inverter is lower than the output power of the inverter, the inverter 20 may consume the power of the power grid 40 in reverse. Of course, in this case, the inverter may prevent power from being reversed by blocking the power flowing into the power grid 40. Accordingly, various optimal control methods for extracting maximum power from the solar power supply 10 are applied to the solar power generation system so that the above-described operation of the inverter 20 can be performed more efficiently.

As a representative maximum power point (MPP) method of the solar power supply 10, there are a perturbation and observation (PO) method, an incremental conductance (IC) control method, a constant voltage (CV) control method, and the like. Here, the PO method is a method of periodically measuring the voltage and current of the solar power supply 10 to calculate power and then tracking the MPP using the power value. The IC control method is a method of measuring the voltage and current generated from the solar power supply 10 so that the rate of change of the power with respect to the change of the operating point of the terminal voltage of the array becomes '0'. The CV control method is a method of controlling the solar power supply 10 with a constant reference voltage (ref V) regardless of the operating voltage or power of the array. According to each optimal control method, a power source inputted from the solar power supply 10 to the inverter may operate as a voltage source or a current source.

The load 50 according to an embodiment may refer to a product using an electricity type used in real life. For example, the inverter 20 may obtain AC power of a desired voltage and frequency through an appropriate conversion method, a switching element, or a control circuit, and supply electricity to home appliances in general homes or machinery products in industrial facilities.

In addition, in the case of solar power generation, a gap in power generation, during which sufficient power generation is not achieved due to night time when solar light is unavailable or changes in weather, occurs inevitably. Therefore, in order to compensate for such disadvantages, the solar power generation system is essentially equipped with a battery to enable stable power supply.

A battery pack 30 according to an embodiment may comprise at least one of a converter, a battery pack, a battery management system (BMS), and a battery control circuit.

The battery may be composed of a lithium ion battery or a nickel hydrogen battery, but is not necessarily limited to this configuration, and may refer to a battery that can be used semi-permanently through charging.

DC-DC converter is a device that can convert DC power produced through the solar power supply 10 into DC power suitable for a battery. In general, a power is converted in a way that a DC power is converted into an AC power and then the AC power is reverse converted to a DC power.

The battery management system (BMS) may provide a function of misuse protection of cells constituting the battery, balancing between unit cells, measuring the remaining amount of the charge (SOC), temperature maintenance management, or system monitoring function. Therefore, based on a sensor measuring the state of the cell and a function of receiving the measured value of the sensor and transmitting it to the control system of the applied product, it is possible to build and control circuits that generate an abnormal signal when the temperature and charging state and the like of the system exceed the set value and cut-off and open the power circuit between cells.

Meanwhile, the inverter 20 and the battery pack 30 may further comprise a display device (not shown). For example, the user can check the supply and demand status of the power of the solar panel, reverse wiring, sleep mode operation, or the state of charge of the battery through the display device. Meanwhile, the display device may be a liquid crystal display, a thin film transistor-liquid crystal display, an organic light-emitting diode, a flexible display, a three dimensional (3D) display, an electrophoretic display, or the like. In addition, the display device may comprise two or more displays depending on the implementation type. In addition, when the touch pad of the display has a layer structure and is configured as a touch screen, the display may also be used as an input device in addition to an output device.

In addition, the inverter 20 and the battery pack 30 may communicate with each other through wired communication or wireless communication. For example, the inverter 20 and the battery pack 30 may comprise a Wi-Fi chip, a Bluetooth chip, a wireless communication chip, an NFC chip, or the like. Of course, the inverter 20 and the battery pack 30 may communicate with each other using various external devices using a Wi-Fi chip, a Bluetooth chip, a wireless communication chip, an NFC chip, and the like. The Wi-Fi chip and the Bluetooth chip can perform communication using a Wi-Fi method and a Bluetooth method, respectively. In the case of using a Wi-Fi chip or a Bluetooth chip, various types of connection information such as SSID, session key, and the like are first transmitted and received, and by using this, communication is connected and then various types of information may be transmitted and received. The wireless communication chip may perform communication according to various communication standards such as IEEE, Zigbee, 3rd Generation (3G), 3rd Generation Partnership Project (3GPP), Long Term Evolution (LTE), and the like. The NFC chip can operate in a Near Field Communication (NFC) method using a 13.56 MHz band among various RF-ID frequency bands such as 135 kHz, 13.56 MHz, 433 MHz, 860 to 960 MHz, 2.45 GHz, and the like.

Meanwhile, in the case of a solar power generation system, a solar-related energy storage system can be constructed using the battery pack 30 described above. However, in the case of a battery included therein, when an over-discharging occurs due to the solar power generation environment and electricity consumption, a case of unrecoverable damage occurs.

Accordingly, in the solar energy storage system according to an embodiment, in order to prevent over-discharging of the battery, when a remaining amount value (SOC) of a battery is less than or equal to a first value, the battery is switched to a sleep mode in which some functions are deactivated to minimize battery power consumption, and when the remaining amount of the battery is less than or equal to a second value, the battery may be physically separated thereby preventing over-discharging of the battery.

Hereinafter, a solar-related energy storage system for preventing over-discharging of a battery will be described in detail.

Figure 2:
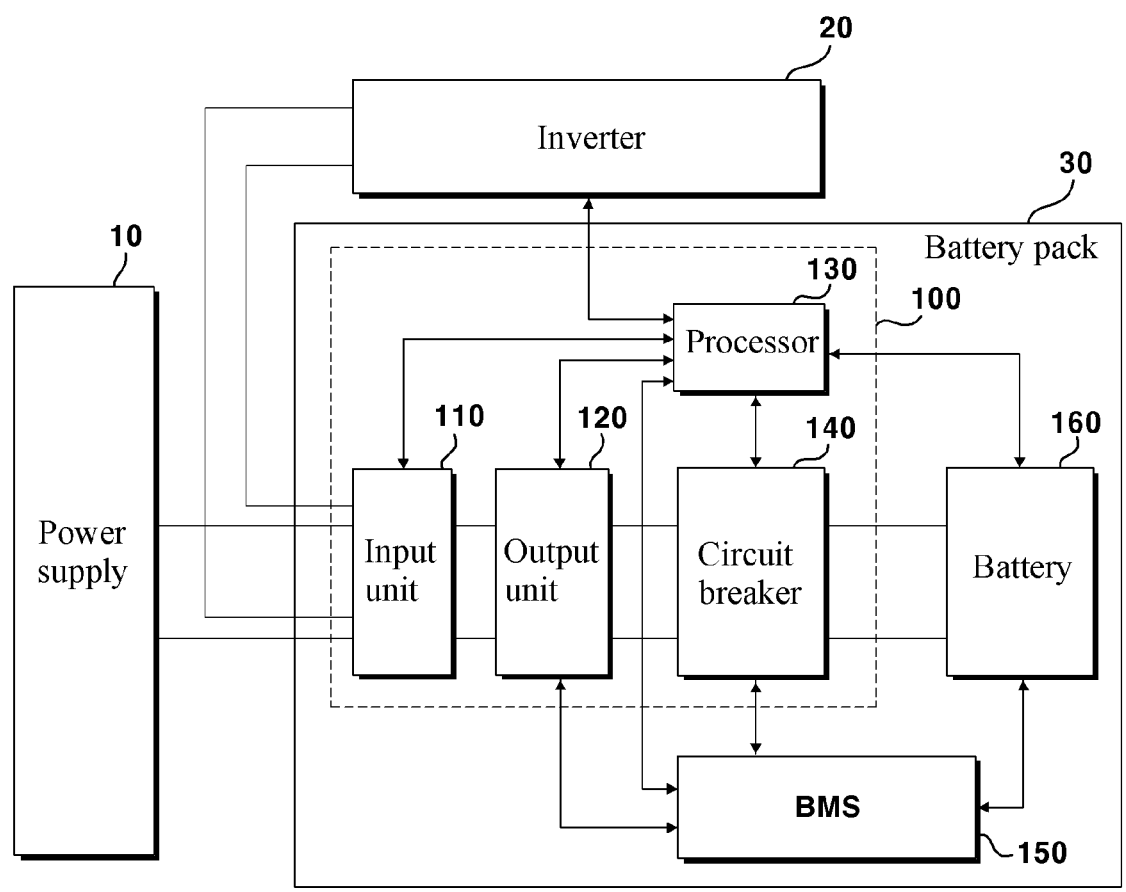
FIG. 2 is a block diagram illustrating in detail a solar-related energy storage system according to an embodiment.

FIG. 2 is a block diagram illustrating in detail a solar-related energy storage system according to an exemplary embodiment.

Referring to FIG. 2, a solar-related energy storage system according to an embodiment may comprise a solar power supply 10, an inverter 20, and a battery pack 30. In addition, the battery pack 30 may comprise a DC-DC converter 100, a BMS 150, and a battery 160, wherein the DC-DC converter 100 comprises an input unit 110, an output unit 120, a processor 130, and a circuit breaker 140. However, this is one embodiment, and the DC-DC converter 100 may comprise the BMS 150 as a constituting element thereof.

Specifically, the input unit 110 receives power from the solar power supply 10.

The output unit 120 converts the power of the input unit 110 and supplies it to the battery 160. For example, DC power input through the input unit 110 may be temporarily converted to AC, and then converted back to DC power of a desired voltage and output to the battery 160. Of course, when the power of the battery 160 is supplied to the inverter 20, the input unit 110 and the output unit 120 may perform opposite functions.

The processor 130 may determine an operation mode according to the state of the battery. Here, the operation mode may comprise a first operation mode, a sleep mode, a second operation mode, and a cut-off mode. For example, during normal operation, the battery pack 30 is operated in a first operation mode in which power is supplied to the inverter 20 using all functions of the battery pack or is charged with power input from the solar power supply 10. However, in the case when the level of the remaining amount (SOC) of the battery is less than or equal to a first value in a state where there is no charge from the solar power supply 10, such as in winter, night, or bad weather in Europe, and the like, the processor 130 controls the battery 160 to switch to the sleep mode to prevent continued consumption of the battery.

For example, the processor 130 may measure a first remaining amount value of the battery 160 in a first operation mode, and switch the first operation mode to a sleep mode when the first remaining amount value is less than or equal to a first value. Here, the first remaining amount value means a value measured in the first operation mode, and the first value may mean that the remaining amount of the charge of the battery obtained through BMS is less than 5%. In addition, the sleep mode here may be a mode for reducing power consumption by deactivating functions other than functions required for communication with the inverter among a plurality of functions activated in the first operation mode.

The processor 130 may switch from the sleep mode to a second operation mode to measure a second value of the battery, and switch the second operation mode to a cut-off mode when a second remaining amount value is less than or equal to the second value. Here, the second remaining amount value means a value measured in the second operation mode, and the second value is less than a first value. In addition, the second operation mode is a mode in which at least one of an analog-digital converter (ADC) sensing function, a pulse width modulation (PWM) function, and a protection function is deactivated.

For example, a second value may mean that the remaining amount of the charge of the battery obtained through BMS is 0% or less. Here, it is considered that a second value of 0% is designed to be displayed to a user as 0% when an actual remaining amount of about 3% is remained in order to prevent complete discharge of the battery.

In addition, in a second operation mode, the processor 130 may switch to a sleep mode when a second remaining amount value of the battery 160 is greater than a second value and less than or equal a first value. For example, the DC-DC converter 100 may determine whether to continuously maintain the sleep mode based on the remaining amount of charge of the battery obtained through the BMS in the second operation mode.

In addition, in a first mode, the processor 130 may switch to a cut-off mode when a first remaining amount of the battery is less than or equal to a second value. For example, the DC-DC converter 100 may skip a sleep mode in a first mode and immediately switch to a cut-off mode.

Also, in a second operation mode, the processor 130 may switch to a first operation mode when a second remaining amount value of the battery is greater than a first value. For example, the processor 130 may determine that the battery 160 is in a state in which charging is possible, and may supply power to the battery 160 by switching to a first operation mode.

In addition, when it is determined that a solar-related energy storage system is in a state in which the battery is chargeable through communication with the inverter while the DC-DC converter 100 is operating in a sleep mode or a cut-off mode, the processor 130 can supply power to the battery by switching to a first operation mode.

For example, since the DC-DC converter 100 maintains communication with the inverter 20 even in the sleep mode, the processor 130 may determine the current state as a state in which the battery can be charged when more than a preset amount of power is supplied from the solar power supply 10.

In addition, while the processor 130 is operating in a cut-off mode, when the current state is a state in which the battery can be charged, the state of the circuit breaker 140 is switched to a connected state so that power can be supplied to the battery 160.

Meanwhile, in the above-described example, a first value and a second value are the exemplary values that can be suggested by the designer to proceed to a sleep mode and a cut-off mode within a range where the second value is smaller than the first value, and the scope of rights is not limited to the above values.

In a processor 130 according to an embodiment, the processor may be implemented as an array of a plurality of logic gates, or a combination of a general-purpose microprocessor and a memory in which a program executable in the microprocessor is stored. In addition, it can be understood by a person of ordinary skill in the art to which the present embodiment pertains that it may be implemented with other types of hardware. In addition, the processor 130 is included in the DC-DC converter 100 in one embodiment, but it may also be installed outside the DC-DC converter 100.

A circuit breaker 140 according to an embodiment may physically separate the battery 160 to cut-off over-discharging of the battery 160 when the remaining amount value of the battery 160 measured in a sleep mode is less than or equal to a preset value. For example, even if the battery 160 is switched to a sleep mode, power may continue to be consumed for some functions (such as an inverter communication function) that are essentially operating. Therefore, when it is determined that a remaining amount of charge received from the BMS is less than 0%, the processor 130 may operate the circuit breaker 140 to prevent an over-discharging of the battery due to continuous battery consumption so that the battery may not be consumed any more. Here, the residual amount value of 0%, which is a reference value for determination, may mean the remaining amount of the battery displayed to the user, but it may mean that the actual battery is in a state in which there is a 3% remaining amount. That is, from the design stage, it is possible to let the remaining amount of charge be displayed as 0% to a user when the minimum remaining battery capacity value for preventing the battery from over-discharging is reached.

The circuit breaker 140 is implemented in the form of a circuit breaker (CB) to physically or electrically block the battery. For example, it may be implemented in the form of a switch, and may be implemented as a two-stage switch to prevent damage to a circuit due to a sudden change in current, or may be implemented as a FET to cut-off only power discharged from the battery 160.

Hereinafter, an operation of a DC-DC converter for a solar-related energy storage system according to an embodiment will be described in detail with reference to FIGS. 3 to 9.

Figure 3:
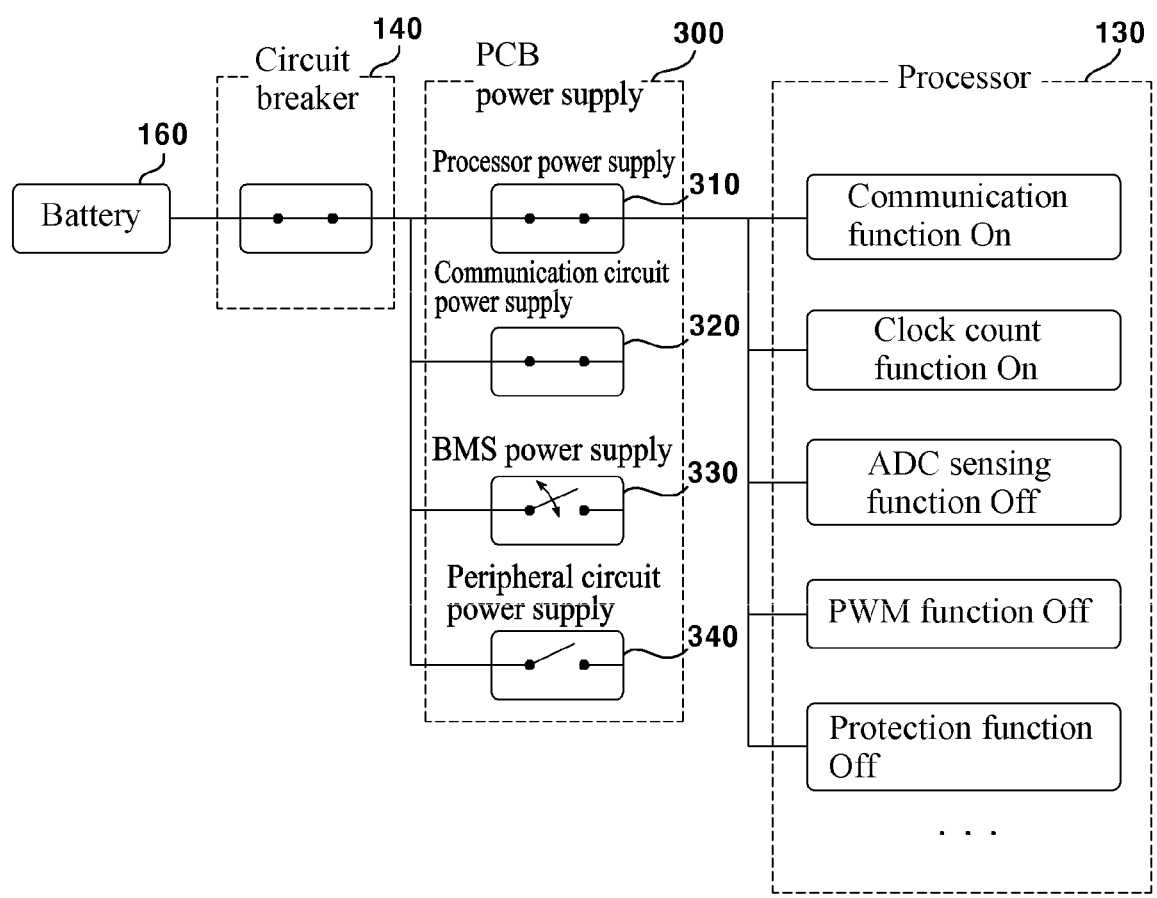
FIG. 3 is a diagram illustrating a sleep mode according to an embodiment.

FIG. 3 is a diagram for describing a sleep mode according to an embodiment.

A DC-DC converter according to an embodiment may comprise a PCB power supply 300. Here, the PCB (Printed Circuit Substrate) may mean a substrate in which a conductor circuit is formed on one insulating substrate based on the design of circuit components. Accordingly, each component of a DC-DC converter 100 according to an embodiment may configure the PCB power supply 300 so that a circuit is designed based on a PCB and power is inputted for each circuit. For example, the PCB power supply 300 may comprise a processor power supply 310, a communication circuit power supply 320, a BMS power supply 330, and other peripheral circuit power supply 340. Meanwhile, when the DC-DC converter 100 is switched to a sleep mode according to an embodiment, power for some functions among the PCB power supply 300 may be cut-off in order to minimize the consumption of the battery 160. For example, the power of the BMS power supply 330 and the peripheral circuit power supply 340, which consume relatively high battery power, are cut-off, and only the processor power supply 310 for controlling the DC-DC converter 100 and the communication circuit power supply 320 for maintaining communication with the inverter 20 and the like may be maintained.

In addition, a DC-DC converter 100 according to an embodiment may prevent additional power loss by terminating (turning off) some functions of the processor 130 being operated according to an input of the processor power supply 310. For example, in a sleep mode, at least one or more of the functions (ADC sensing function, PWM function, and protection function) except a function for communicating with the inverter and a clock count function may be deactivated. Here, the function for communicating with the inverter is maintained in order to wake up from the sleep mode by communicating with the DC-DC converter 100 and switch to a first operation mode later when the solar power supply becomes a state capable of generating a power. In addition, the clock count function may be maintained in an activated state in order to determine when a preset time elapses even in the sleep mode of the DC-DC converter 100 and temporarily operate in a second operation mode.

Meanwhile, as described above, since the BMS power supply 330 is turned off during a sleep mode operation, the DC-DC converter 100 may not be aware of the information on the remaining amount value of the battery. Accordingly, as illustrated in FIG. 4, the DC-DC converter 100 may temporarily turn on only the BMS power supply to check the remaining amount value at each preset time interval and switch to a second operation mode.

Figure 4:
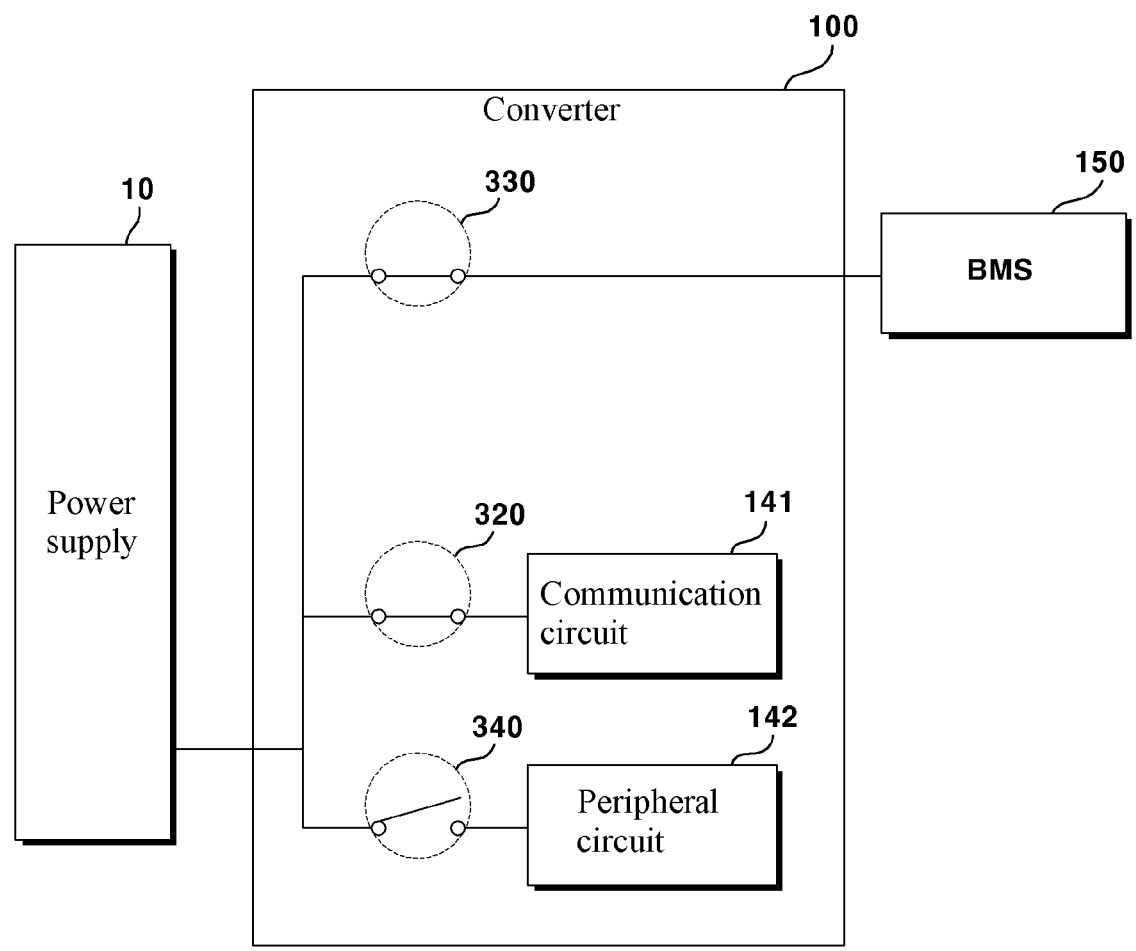
FIG. 4 is a block diagram illustrating a second operation mode according to an embodiment.

FIG. 4 is a block diagram for describing a second operation mode according to an embodiment.

In a second operation mode according to an embodiment, the DC-DC converter 100 may temporarily connect the BMS power supply 330 to receive the BMS 150 information. At this time, the communication circuit power supply 320 connected to the communication circuit 141 for communicating with the inverter still maintains a closed state, and the peripheral circuit power supply 340 connected to a peripheral circuit 142 still maintains an open state so that the power consumption can be minimized. In addition, unlike a first operation mode, in a second operation mode, at least one of an analog-digital converter (ADC) sensing function, a pulse width modulation (PWM) function, and a protection function is deactivated, thereby minimizing the power consumption.

Figure 5:
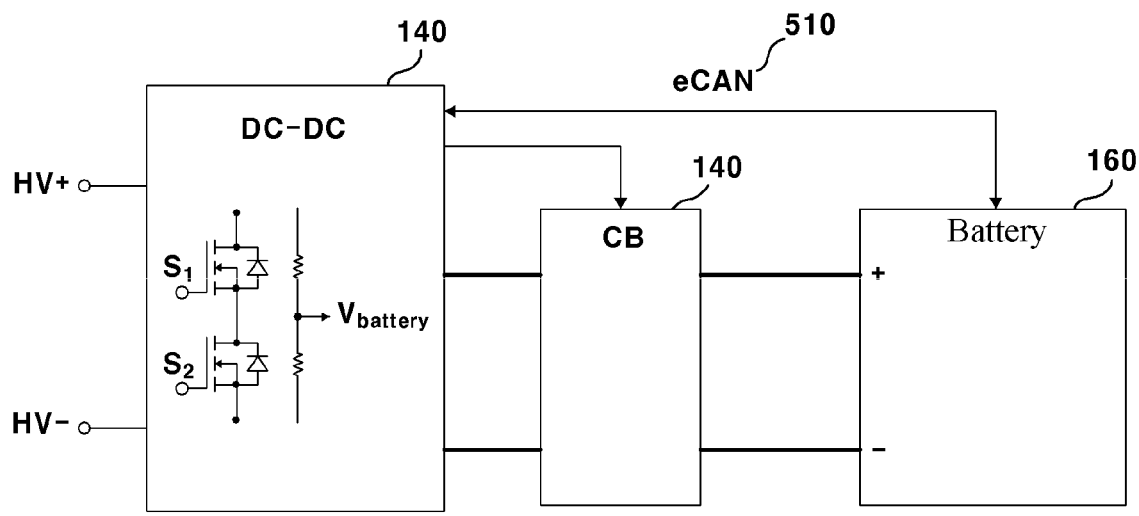
FIG. 5 is a block diagram illustrating a cut-off mode according to an embodiment.

FIG. 5 is a block diagram for describing a cut-off mode according to an embodiment.

Referring to FIG. 5, the DC-DC converter 100 may check the remaining amount charge value using the CAN communication 510 of the BMS at a certain period. In addition, a circuit breaker 140 capable of physically or electrically cutting off the power consumption may be disposed between the DC-DC converter 100 and the battery 160. Accordingly, the DC-DC converter 100 may fundamentally cut-off the power consumption due to the solar-related energy storage system by operating the circuit breaker based on the remaining amount charge value of the battery 160 to protect the battery from over-discharging.

Here, the circuit breaker 140 may be implemented in the form of a circuit breaker (CB) to physically cut-off the battery. For example, it may be implemented in the form of a switch, and may be implemented as a two-stage switch to prevent damage to a circuit due to a rapid current change, or as a FET to cut-off only the power discharged from the battery. The principle that the circuit breaker 140 is implemented as a two-stage switch will be described in detail later in the description of FIG. 8.

Figure 6:
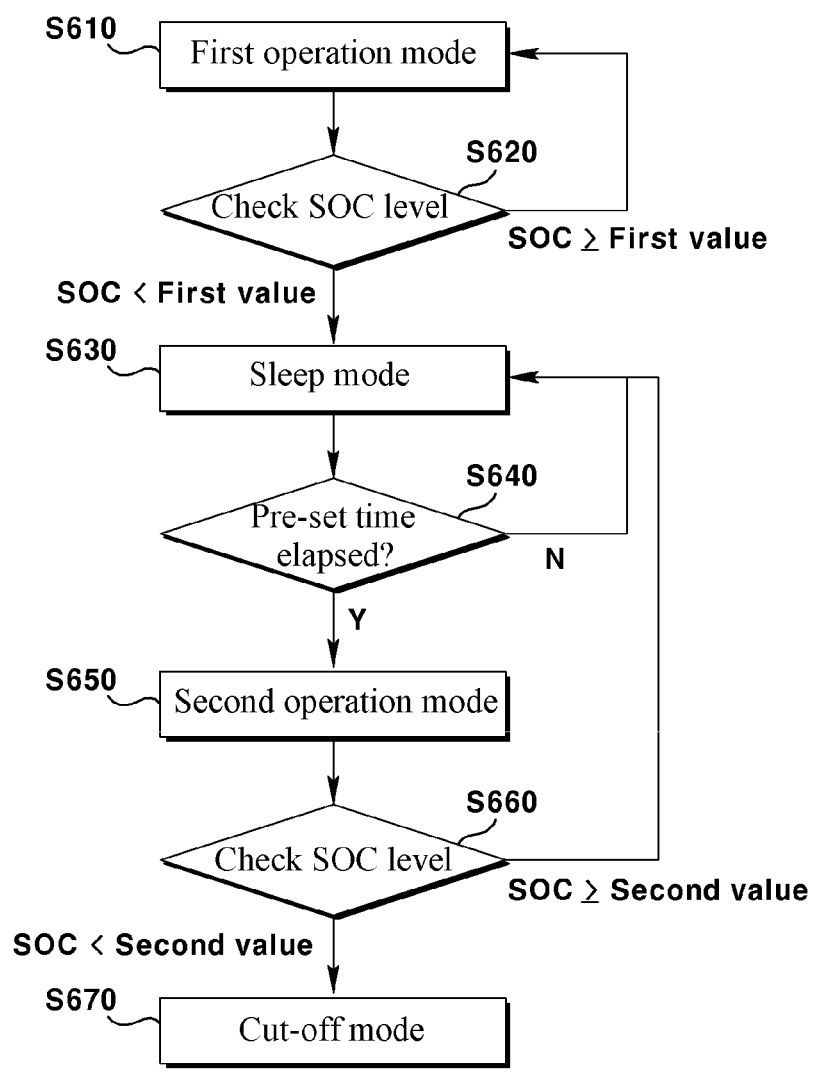
FIG. 6 is a flowchart illustrating an example of switching to a sleep mode and a cut-off mode according to an embodiment.

FIG. 6 is a flowchart for describing an example of switching to a sleep mode and a cut-off mode according to an embodiment.

Referring to FIG. 6, the DC-DC converter 100 checks the level of the remaining amount value (SOC) of the battery, and according to the level of the SOC, it can be operated in one of a first operation mode, a second operation mode, a sleep mode, and a cut-off mode.

In step S610, the DC-DC converter operates in a first operation mode in which power is supplied to a peripheral circuit and the like without limiting power consumption of the battery or a solar power supply is charged with a battery. In the first operation mode, the power supply of the battery is always connected to the BMS, so that level of the SOC of the battery can be checked at any time. The first operation mode may represent a mode in which a normal operation is performed.

In step S620, the DC-DC converter 100 checks the SOC level and, if the SOC level is smaller than the first value, and proceeds to step S630 to switch to a sleep mode. The first value may be predetermined, for example, the first value may be 5%. According to an embodiment, when the DC-DC converter 100 is switched to a sleep mode, power for some functions of the PCB power supply 300 may be cut-off in order to minimize the consumption of the battery 160. For example, the BMS power supply 330 and the peripheral circuit power supply 340, which consume relatively high battery power, are cut-off, and only the processor power supply 310 for controlling the DC-DC converter 100 and the communication circuit power supply 320 for maintaining communication with the inverter 20 and the like may be maintained. In this case, since only power required for communication is consumed, the amount of power consumed may be less than that of a first operation mode. However, since power consumption for communication occurs, an over-discharging of the battery may occur when operating for a sufficiently long time in a sleep mode.

In step S620, if the SOC level is greater than a first value, the DC-DC converter may return to step S610 and continue to maintain a first operation mode.

Meanwhile, in step S640, when a preset time (for example, 6 hours) elapses in a sleep mode state, the DC-DC converter temporarily proceeds to step S650 to switch to a second operation mode, and proceeds to step S660 to check the value (SOC) level again. In the sleep mode, since the battery management system (BMS) is deactivated to minimize power consumption, only the BMS function can be temporarily activated to check the SOC level in the second operation mode.

If the value of the SOC level measured at this time is smaller than a second value, the DC-DC converter proceeds to step S670 to switch to the cut-off mode. Also, when the SOC level is greater than a second value, the DC-DC converter 100 may proceed to step S630 to switch to a sleep mode. At this time, the SOC level is usually smaller than a first value, but may be larger than a second value. Although not illustrated in FIG. 6, when the SOC level is greater than the first value, the DC-DC converter 100 may proceed to step S610 to operate in a first operation mode.

Here, a second value has a value smaller than a first value. For example, the second value may mean that the remaining amount of the charge of the battery obtained through BMS is 0% or less. Here, the second value can be designed to be displayed to a user as 0% when the actual remaining amount of about 3% remains to prevent complete discharge of the battery, and the level of the remaining amount (SOC) value that is displayed to the user as 0% may represent the second value.

Meanwhile, in FIG. 6, it has been described that a sleep mode and a cut-off mode are sequentially performed, but the configuration is not limited thereto.

Figure 7:
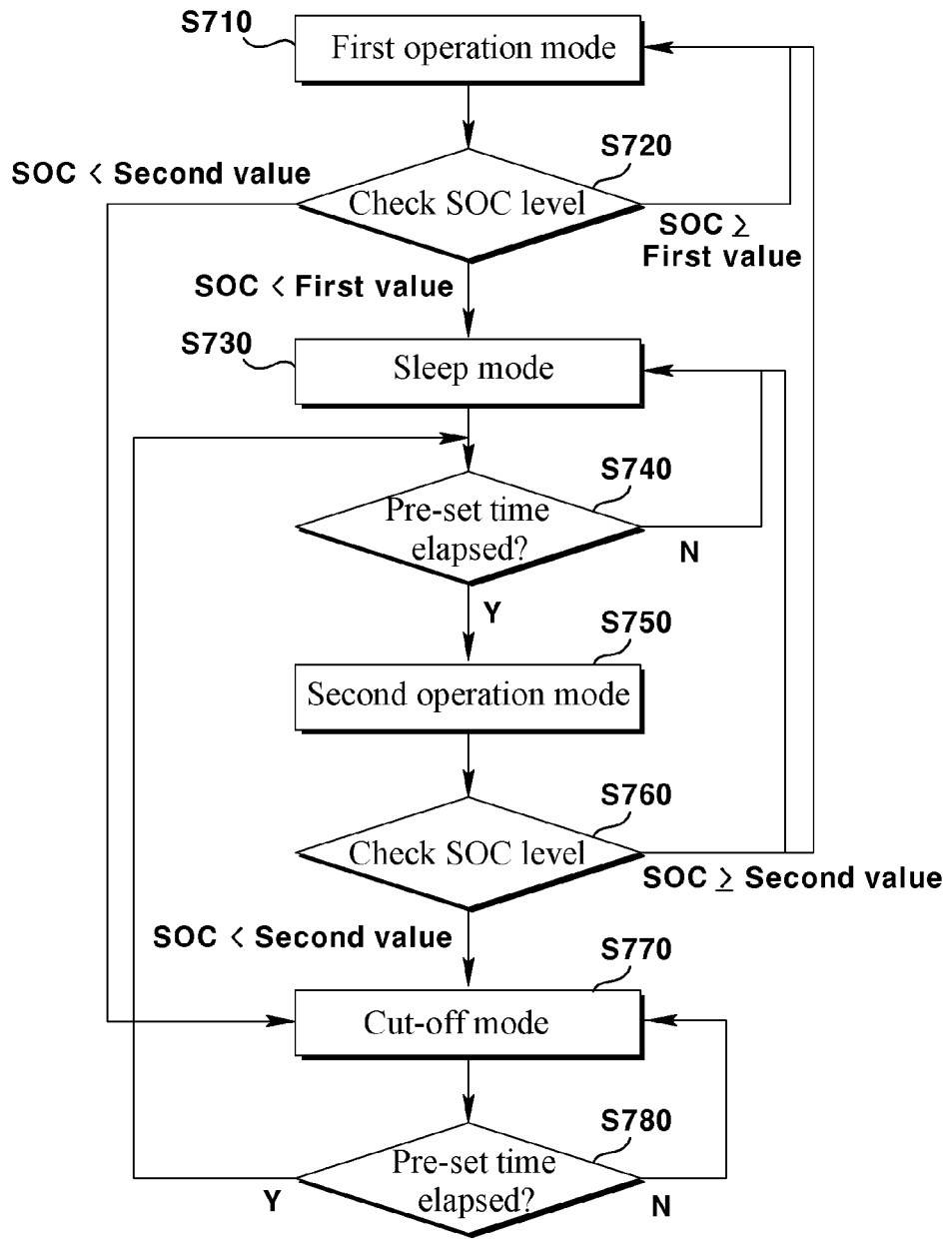
FIG. 7 is a flowchart illustrating an example of switching to a sleep mode and a cut-off mode according to another embodiment.

For example, FIG. 7 is a flow chart for describing an example of switching to a sleep mode and a cut-off mode according to another embodiment.

Steps S710 to S770 in FIG. 7 correspond to S610 to S670 of FIG. 6, respectively, so a description of overlapping contents will be omitted, and differences will be described in detail.

In step 710, the DC-DC converter 100 operates in a first operation mode.

In step S720, the DC-DC converter 100 checks the SOC level and switches to a sleep mode (S730) when the SOC level is smaller than a first value, and when it is smaller than a second value, it is possible to immediately switch to a cut-off mode (S670).

In step S740, when a preset time (for example, 6 hours) elapses in a state of a sleep mode, the DC-DC converter 100 temporarily proceeds to step S650 to switch to a second operation mode, and proceeds to step S760 to check the SOC level again. In a state of a sleep mode, since the battery management system (BMS) is deactivated to minimize power consumption, only the BMS function can be temporarily activated to check the SOC level in the second operation mode.

When the value of the SOC level measured at this time is smaller than a second value, the DC-DC converter proceeds to step S770 to switch to a cut-off mode. Also, when the SOC level is smaller than the first value but larger than the second value, it may be switched to a sleep mode again. Further, when the SOC level is greater than a first value, it may be switched to a first operation mode (S710).

In a DC-DC converter 100 according to an embodiment, as a result of checking the SOC level in step S760, may be operated in a cut-off mode when the SOC level is smaller than a second value, a sleep mode when it is smaller than a first value but greater than or equal to a second value, and a first operation mode when it is greater than or equal to a first value.

Or, A DC-DC converter 100 according to an embodiment, as the result of checking the SOC level in step S760, may operate in a cut-off mode when the SOC level is smaller than a second value and in a sleep mode when it is greater than or equal to the second value. In this case, the DC-DC converter 100 checks the SOC level in a sleep mode, and may operate in a first operation mode when the SOC level is sufficiently high (for example, the SOC level is greater than or equal to a first value).

Meanwhile, in a cut-off mode (S770), when all voltages inputted to a DC-DC converter 100 are physically cut-off, the DC-DC converter cannot be operated any more, and therefore the mode may not be switched from the cut-off mode to a first operation mode or a sleep mode.

However, a DC-DC converter according to an embodiment may be designed in a way that by maintaining a clock count function of the DC-DC converter 100 even in a cut-off mode (S770), the remaining amount of the battery value at preset time intervals (S780) is measured to re-enter into a sleep mode or re-enter in to a sleep mode when the remaining amount value of the charge changes due to temperature changes and the like.

Or, when more than a predetermined amount of power is inputted from the solar power supply, the DC-DC converter automatically determines that the battery is in a chargeable state due to an inputted power supply, and exits the cut-off mode and switches the circuit breaker into a closed state again so as to supply power to the battery. For example, the DC-DC converter may be designed in a way that when it determines that the battery is in a chargeable state, it is automatically switched back to a sleep mode (S730) or a first operation mode (S710).

Further, through communication with the inverter, the DC-DC converter 100, even while operating in a sleep mode or a cut-off mode, determines whether the current state is a state in which the battery can be charged, and when it is in a possible state, it may also immediately switch to a first operation mode.

Figure 8:
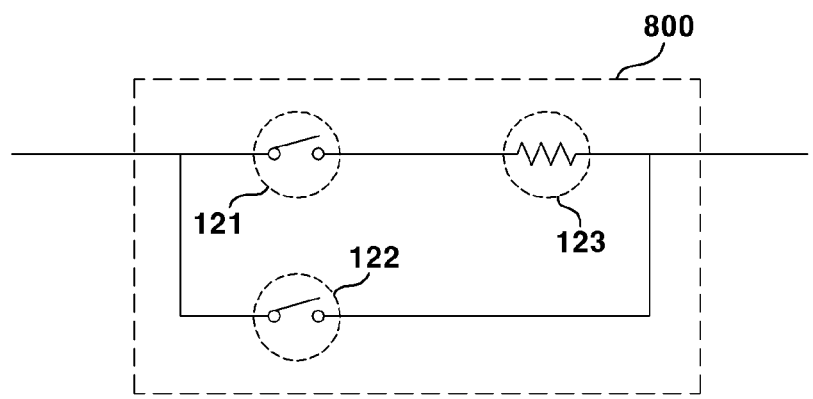
FIG. 8 is a diagram illustrating an example of implementing a switch in a cut-off mode according to an embodiment.

FIG. 8 is a diagram illustrating an example of implementing a switch 800 in a cut-off mode according to an embodiment. The switch 800 may be included in a circuit breaker 140, or the switch 800 may be used to connect the circuit breaker 140 and the battery 160.

Referring to FIG. 8, a switch 800 according to an embodiment may comprise a first line comprising a first switch 121 and a resistor 123 connected in series with the first switch 121, and a second line connected in parallel with the first line and comprising a second switch 122.

As illustrated in FIG. 8, when the switch 800 is configured in two stages, it may be provided with a structure that prevents the elements inside the switch 800 (e.g., the first switch 121 and the second switch 122) from being damaged by a high current, and each of the first switch 121 and the second switch 122 may be implemented as a single FET so as not to block the current charged by the battery.

As another example, each of the switches 121 and 122 may be implemented with two FETs to pass current discharged from the battery. When the switches 121 and 122 are implemented with two FETs, the diode directions of each FET may be located in the directions opposite from each other.

Such an operation of the switch 800 may be controlled by a processor 130 according to an embodiment, and the battery may enter into a cut-off mode to prevent over-discharging. In addition, it may be designed in a way that, even in a cut-off mode, the switch can be automatically closed to proceed to a sleep mode when power is inputted from the solar power supply 10.

Figure 9:
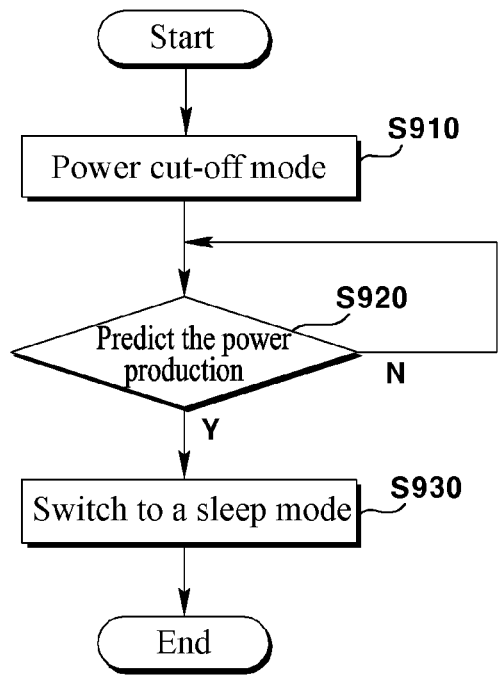
FIG. 9 is a diagram illustrating an example of releasing a sleep mode or a cut-off mode based on a change in the amount of sunlight or a change in weather, according to an embodiment.

FIG. 9 is a diagram illustrating an example of releasing a cut-off mode based on a change in the amount of sunlight or a change in weather, according to an embodiment.

Referring to FIG. 9, in step S910, the circuit breaker is operated based on the SOC level so that the solar power generation system may enter into a power cut-off mode.

In step S920, the solar power generation system may predict the amount of electricity generated according to the change in weather and the change in the amount of sunlight based on data collected from the data of Korea Meteorological Administration or a solar panel. For example, when the current time is 7 am and it is predicted that the solar panel will generate power in consideration of the season and the weather, it enters into step S930 to switch to a sleep mode.

However, when the amount of sunlight is still insufficient and power production is not predicted, it is possible to maintain a power cut-off mode and determine whether power production is predicted at a preset time period. Of course, the solar power generation system can control the DC-DC converter of the battery pack so that the sleep mode is also released when the SOC level rises above a preset value.

Figure 10:
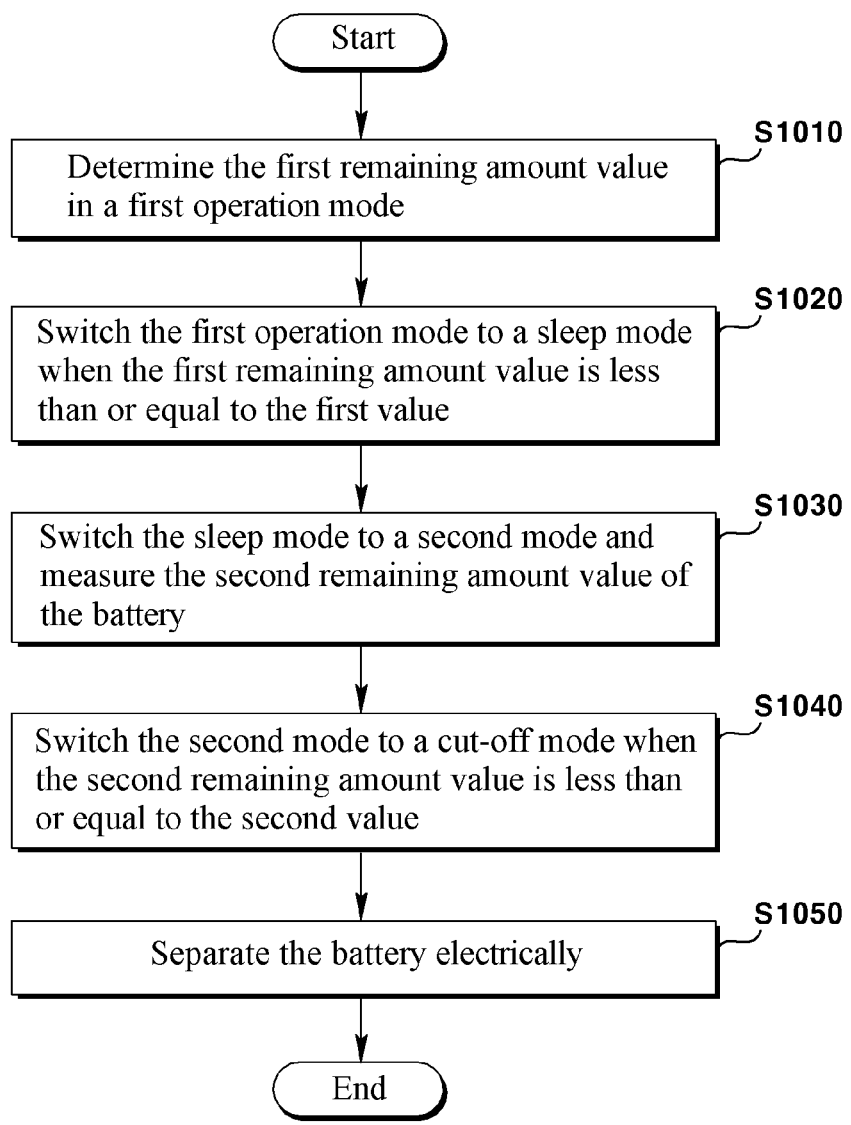
FIG. 10 is a flowchart illustrating a method of controlling a DC-DC converter according to an embodiment.

FIG. 10 is a flowchart for describing a method of controlling a DC-DC converter according to an embodiment. Referring to FIG. 10, the method of controlling DC-DC converter comprises steps that the DC-DC converter 100 illustrated in FIGS. 2, 3 and 4 processes in time series. Accordingly, it can be seen that, even the contents omitted hereinafter, the contents described above regarding the DC-DC converter 100 illustrated in FIGS. 2, 3, and 4 are also applied to the method illustrated in FIG. 10.

In step S1010, the DC-DC converter determines a first remaining amount value of the battery in a first operation mode. Here, the first operation mode means a general operation mode in which the battery can be charged and discharged, and a first value may mean that the remaining amount of the charge of the battery obtained through BMS is less than 5%.

In step S1020, when a first remaining amount value is less than or equal to a first value, the DC-DC converter switches a first operation mode to a sleep mode. Here, the sleep mode may be a mode for reducing power consumption by deactivating functions other than a function required for communicating with an inverter among a plurality of functions activated in the first operation mode.

In step S1030, the DC-DC converter switches from a sleep mode to a second operation mode and measures the second remaining amount value of the battery. Here, the second remaining amount value means a value measured in a second operation mode, and the second value is smaller than the first value. In addition, as in the sleep mode, the second operation mode may mean a mode in which the remaining amount value of the battery can be measure by activating the BMS instead of deactivating at least one of an analog-digital converter (ADC) sensing function, a PWM (Pulse width modulation) function, and a protection function.

In addition, the second value may mean that the remaining amount of the charge of the battery obtained through BMS is 0% or less. Here, the second value may mean a value designed to be displayed to a user as 0% when an actual remaining amount of about 3% remains to prevent complete discharging of the battery.

In step S1040, when the second residual amount value is less than or equal to a second value, the DC-DC converter switches the second operation mode to a cut-off mode.

In step S1050, the DC-DC converter electrically disconnects the battery. Therefore, the damages due to an over-discharging of the battery can be minimized. Meanwhile, even when the DC-DC converter enters into a cut-off mode, it may be designed to switch back to a sleep mode or a first operation mode when a preset condition is satisfied. The preset condition may be simply a certain time interval, and further, may be designed to detect or predict that power is inputted through the solar power supply.

Figure 11:
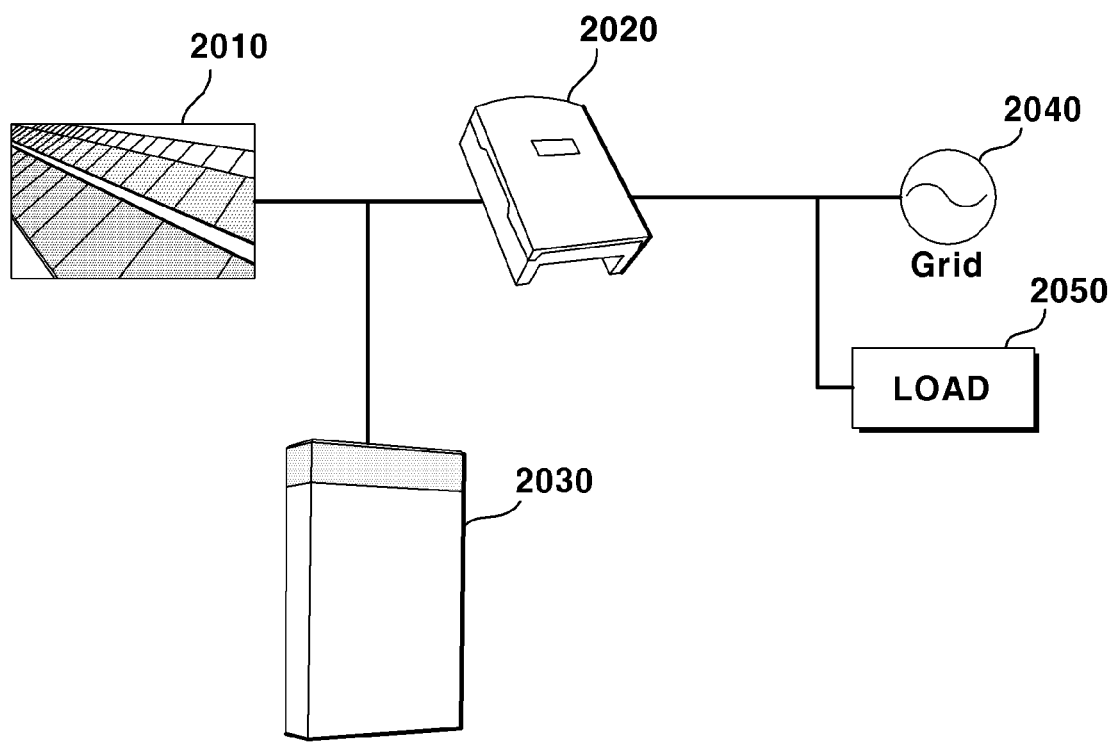
FIG. 11 is a diagram illustrating a solar power generation system according to an embodiment.

FIG. 11 is a diagram illustrating a solar power generation system according to an embodiment.

As illustrated in FIG. 11, a solar power generation system may comprise a solar panel 2010, an inverter 2020, a battery pack 2030, and a load 2050.

However, it can be understood by a person of ordinary skill in the related art that other general-purpose components other than the components illustrated in FIG. 11 may be further included in a solar power generation system. For example, the solar power generation system may further comprise a power grid 2040. Or, according to another embodiment, it may be understood by a person of ordinary skill in the related art that some of the components illustrated in FIG. 11 may be omitted.

A solar panel 2010 according to an embodiment may be composed of a plurality of photovoltaic modules, in which photovoltaic cells are assembled, and a photovoltaic cell, in which a p-type semiconductor and an n-type semiconductor are bonded, generates electricity using light. Specifically, when light is irradiated on a photovoltaic cell, electrons and holes are generated inside. The generated charges move to the P and N poles, respectively, and a potential difference occurs between the P and N poles by this action, and when a load is connected to the photovoltaic cell, current flows. Here, the photovoltaic cell means the smallest unit that generates electricity, and the photovoltaic cells are gathered to form a battery module, and the battery modules can form an array connected in series and/or parallel to form a solar panel 2010.

In order to supply power to a power grid 2040 or a load 2050, the inverter 2020 according to an embodiment may convert a DC power generated by the solar panel 2010 into an AC power by the photoelectric effect. Here, the power grid 2040 may refer to a grid for transmitting and distributing power generated by the solar power generation system. Meanwhile, the amount of power generated by the solar panel 2010 is continuously changed by temporal factors such as sunrise and sunset, or external factors such as weather and the like. Therefore, the inverter 2020 finds the maximum power by controlling the voltage generated from the solar panel 2010 and supplies it to the power grid 2040. In this case, when the power for operating the inverter is lower than the output power of the inverter, the inverter 2020 may reversely consume the power of the power grid 2040. Of course, in this case, the inverter may prevent power from being reversed by cutting off the power flowing into the power grid 2040. Accordingly, various optimized control methods for extracting maximum power from the solar panel 2010 are applied to the solar system so that the above-described operation of the inverter 2020 can be performed more efficiently.

As a representative maximum power point (MPP) method of the solar panel 2010, there are a perturbation and observation (PO) method, an incremental conductance (IC) control method, a constant voltage (CV) control method, and the like. Here, the PO method is a method of periodically measuring the voltage and current of the solar panel 2010 to calculate power and then tracking the MPP using the power value. The IC control method is a method of measuring the voltage and current generated from the solar panel 2010 so that the rate of change of the power with respect to the change of the operating point of the terminal voltage of the array becomes '0'. The CV control method is a method of controlling the solar panel 2010 with a constant reference voltage (ref V) regardless of the operating voltage or power of the array. According to each optimal control method, a power source inputted from the solar panel 2010 to the inverter may operate as a voltage source or a current source.

The load 2050 according to an embodiment may refer to a product using an electricity type used in real life. For example, the inverter 2020 may obtain AC power of a desired voltage and frequency through an appropriate conversion method, a switching element, or a control circuit, and supply electricity to home appliances in general homes or machinery products in industrial facilities.

In addition, in the case of solar power generation, a gap in power generation, during which sufficient power generation is not achieved due to night time when solar light is unavailable or changes in weather, occurs inevitably. Therefore, in order to compensate for such disadvantages, the solar power generation system is essentially equipped with a battery to enable stable power supply.

A battery pack 2030 according to an embodiment may comprise at least one of a converter, a battery pack, a battery management system (BMS), and a battery control circuit.

The battery may be composed of a lithium ion battery or a nickel hydrogen battery, but is not necessarily limited to this configuration, and may refer to a battery that can be used semi-permanently through charging.

DC-DC converter is a device that can convert DC power produced through the solar panel 2010 into DC power suitable for a battery. In general, a power is converted in a way that a DC power is converted into an AC power and then the AC power is reverse converted to a DC power.

The battery management system (BMS) may provide a function of misuse protection of cells constituting the battery, balancing between unit cells, measuring the remaining amount of the charge (SOC), temperature maintenance management, or system monitoring function. Therefore, based on a sensor measuring the state of the cell and a function of receiving the measured value of the sensor and transmitting it to the control system of the applied product, it is possible to build and control circuits that generate an abnormal signal when the temperature and charging state and the like of the system exceed the set value and cut-off and open the power circuit between cells.

Meanwhile, the inverter 2020 and the battery pack 2030 may further comprise a display device (not shown). For example, the user can check the supply and demand status of the power of the solar panel, reverse wiring, sleep mode operation, or the state of charge of the battery through the display device. Meanwhile, the display device may be a liquid crystal display, a thin film transistor-liquid crystal display, an organic light-emitting diode, a flexible display, a three dimensional (3D) display, an electrophoretic display, or the like. In addition, the display device may comprise two or more displays depending on the implementation type. In addition, when the touch pad of the display has a layer structure and is configured as a touch screen, the display may also be used as an input device in addition to an output device.

In addition, the inverter 2020 and the battery pack 2030 may communicate with each other through wired communication or wireless communication. For example, the inverter 2020 and the battery pack 2030 may comprise a Wi-Fi chip, a Bluetooth chip, a wireless communication chip, an NFC chip, or the like. Of course, the inverter 2020 and the battery pack 2030 may communicate with each other using various external devices using a Wi-Fi chip, a Bluetooth chip, a wireless communication chip, an NFC chip, and the like. The Wi-Fi chip and the Bluetooth chip can perform communication using a Wi-Fi method and a Bluetooth method, respectively. In the case of using a Wi-Fi chip or a Bluetooth chip, various types of connection information such as SSID, session key, and the like are first transmitted and received, and by using this, communication is connected and then various types of information may be transmitted and received. The wireless communication chip may perform communication according to various communication standards such as IEEE, Zigbee, 3rd Generation (3G), 3rd Generation Partnership Project (3GPP), Long Term Evolution (LTE), and the like. The NFC chip can operate in a Near Field Communication (NFC) method using a 13.56 MHz band among various RF-ID frequency bands such as 135 kHz, 13.56 MHz, 433 MHz, 860 to 960 MHz, 2.45 GHz, and the like.

Meanwhile, in the case of the battery pack 2030, when installed in a solar power generation system, a case where DC polarities are confusedly installed often occurs. In this case, not only a product damage problem such as a burnout damage of an internal device may occur, but also the safety of workers may be threatened.

Figure 12:
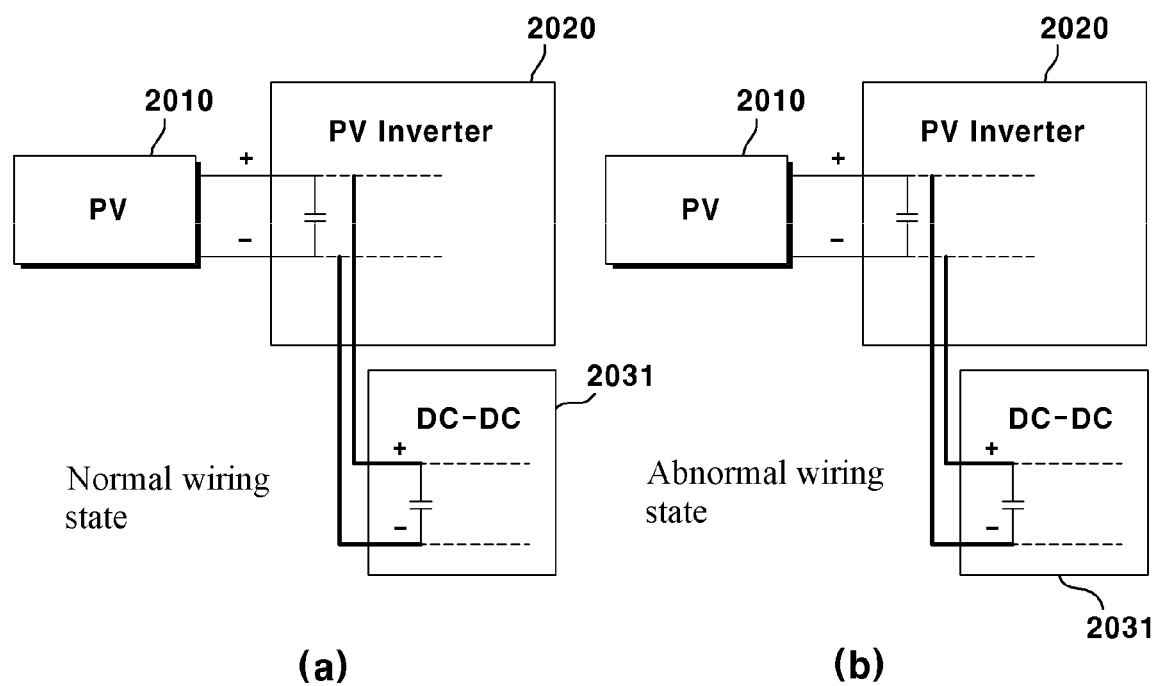
FIG. 12 is a block diagram illustrating an example in which a battery is reverse wired to a solar power generation system according to an embodiment.

For example, FIG. 12 shows an example in which the battery pack 2030 is reversely wired to the solar power generation system according to an embodiment.

Referring to FIG. 12(*a*), the solar panel 10 of the solar power generation system in a normal wiring state remains the same as the polarity connected to the inverter 2020, and wired with a DC-DC converter 2031 of the battery pack.

However, a reverse wiring occurs when the DC-DC converter 2031 of the battery pack is connected opposite to the polarity in which the solar panel 2010 and the inverter 2020 are connected as shown in FIG. 12(*b*). In particular, in the case of solar power generation, since each module is often installed by different business operators, reverse wiring is likely to occur. In addition, in the case of a battery, since current must flow in both directions for charging and discharging power, it may be difficult to prevent reverse wiring by simply using a diode.

Hereinafter, referring to FIG. 13, an example of a reverse wiring protection device 3100 according to an embodiment, which protects a circuit of a solar power system even when reverse wiring occurs due to confusion of DC polarities when a battery pack is installed will be described.

Figure 13:
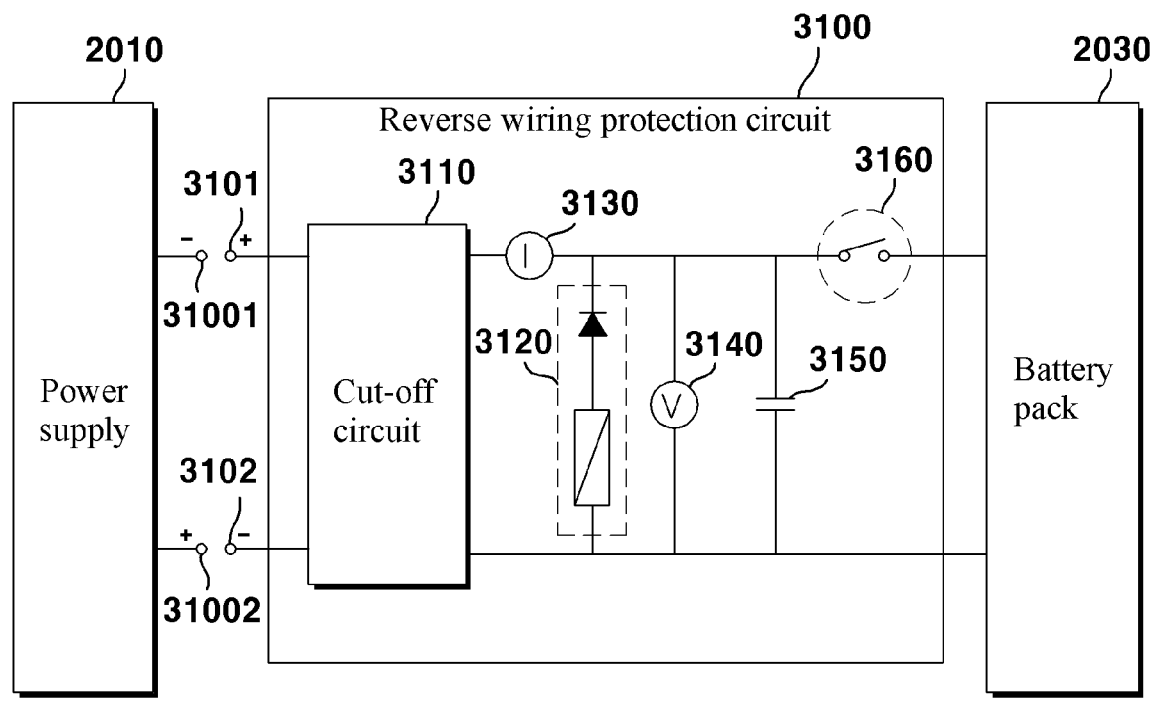
FIG. 13 is a block diagram illustrating an example of configuring a reverse wiring protection device according to an embodiment.

As illustrated in FIG. 13, a solar panel 2010 according to an embodiment is connected to a battery pack 2030 through a reverse wiring protection device 3100 to cut-off power when a reverse wiring occurs so that the battery pack 2030 can be protected. The reverse wiring protection device 3100 may comprise a cut-off circuit 3110 that blocks power supply when a reverse wiring is sensed, a reverse current pass circuit 3120 comprising a diode and a fuse, a current sensor 3130 that senses a reverse wiring using a current, a voltage sensor 3140 that senses a reverse wiring using a voltage, a capacitor 3150, and a switch 3160.

Meanwhile, it can be understood by a person of ordinary skill in the art that other general-purpose components other than the components illustrated in FIG. 13 may be further included in a reverse wiring protection device 3100. For example, the reverse wiring protection device 3100 may further comprise a display or a communication module. Therefore, when reverse wiring occurs, it can be displayed through the display or a warning to a user through the communication module. Or, according to another embodiment, a person of ordinary skill in the art can understand that some of the components illustrated in FIG. 13 may be omitted or may be one component of a solar panel 2010 or a battery pack 2030. For example, a reverse wiring protection device 3100 according to an embodiment may be included in a battery pack 2030, and a DC-DC converter in the battery pack 2030 may comprise the battery protection device 3100. Specifically, a − electrode 31001 and a + electrode 3102 of the solar panel 2010 will be connected to the + electrode 3101 and a − electrode 3102 of the battery pack 2030 to which the reverse wiring protection device 3100 is connected, respectively. This state is called a reverse wiring state. When a current sensor 3130 or a voltage sensor 3140 of the reverse wiring protection device 3100 senses the reverse wiring, a cut-off circuit 3110 cuts-off the power supply to the battery pack 2030, thereby preventing damages to various devices that are vulnerable to reverse wiring such as a DC-DC converter can be prevented. Meanwhile, when a reverse wiring is sensed, the sensed information is transmitted to the display of the inverter 2020 or the battery pack 2030 to indicate that the wiring is in a reversed state.

The current sensor 3130 according to an embodiment may sense a current to determine whether the current is in a reverse wiring state. For example, the current sensor 3130 may determine whether the current state is a reverse wiring state by sensing not only the direction in which the current flows, but also the amount of change per time in the magnitude of the current. For example, when a reverse wiring occurs, a change in the amount of current per time may occur in the opposite direction compared to the case where the reverse wiring does not occur. In this case, the current sensor 3130 may determine whether the current state is a reverse wiring state by sensing a change amount per time of the magnitude of the current.

In addition, a voltage sensor 3140 according to an embodiment may sense a voltage to determine whether or not it is in a reverse wiring state. For example, the voltage sensor 3140 may determine whether a current state is a reverse wiring state by sensing not only a direction in which the voltage is greater, but also the amount of change per time of the voltage. For example, when a reverse wiring occurs, a change in the magnitude of the voltage per time may occur in the opposite direction compared to the case where the reverse wiring does not occur. In this case, the voltage sensor 3140 may determine whether the current state is a reverse wiring state by sensing the change amount per time of the magnitude of the voltage.

Meanwhile, the reverse wiring protection device 3100 comprises a reverse current pass circuit 3120 and a capacitor 3150 connected in parallel with each other. The capacitor 3150 and the reverse current pass circuit 3120 are connected in parallel as illustrated. In addition, a battery pack 2030 may also be connected in parallel with the reverse current pass circuit 3120. In addition, the reverse current pass circuit 3120 may comprise a diode and a fuse to allow current to flow in a direction in which the reverse current flows.

The fuse may be designed to correspond to the rated power applied to the reverse wiring protection device 3100.

In a reverse current path circuit 3120 according to an embodiment, when a solar panel 2010 is acting as a current source, the current sensor 3130 detects the reverse current and prevents a large amount of reverse current from flowing into the battery pack 2030 before cutting off the power and allows current to flow, thereby acting as a protection circuit.

A reverse current pass circuit 3120 according to an embodiment may provide a path through which reverse current generated by the reverse wiring may flow when a reverse wiring occurs. In addition, a capacitor 3150 according to an embodiment may be connected in parallel with the reverse current pass circuit 3120.

The reverse current pass circuit 3120 and the capacitor 3150 may be used as a path through which reverse current can flow in parallel when a reverse wiring occurs. The capacitor 3150 may allow a reverse current corresponding to the amount of charge charged before the reverse wiring occurs.

In addition, the reverse current pass circuit 3120 may allow a reverse current to flow within a range allowed by the capacity of the fuse or diode. Since the reverse current pass circuit 3120 and/or the capacitor 3150 provide a path through which reverse current can flow, the battery pack 2030 can be protected from the reverse wiring. Or, since the reverse current pass circuit 3120 and/or the capacitor 3150 provide a path through which the reverse current can flow, the reverse current due to the reverse wiring may not flow through the battery pack 2030.

Even when a reverse voltage is applied to the battery pack 2030 due to the reverse wiring, when the current flowing into the battery pack 2030 is practically below a preset value, damages to the battery pack 2030 can be minimized.

The reverse wiring protection device 3100 may further comprise a switch 3160 connecting the reverse current pass circuit 3120 and the battery pack 2030.

A switch 3160 according to an embodiment may operate by receiving a control signal. For example, in a sleep mode, the switch 3160 may be opened by receiving a control signal requesting to be opened. As another example, in an operation mode, the switch 3160 may be closed by receiving a control signal requesting to be closed.

When the state of charge (SOC) of the battery included in the battery pack 2030 is less than or equal to a preset value, the switch 3160 may be opened to prevent consumption of the battery. For example, when the SOC of the battery is less than or equal to a preset value, it may enter into a sleep mode. In the sleep mode, the switch 3160 may be opened so that the battery included in the battery pack 2030 no longer consumes power. In some cases (for example, when the SOC is less than or equal to a preset value), by operating in a sleep mode, complete discharge of the battery can be prevented. Or, by operating in a sleep mode, the maintain time of the battery can be extended.

At this time, the switch is a two-stage switch and may have a structure that prevents the switch from being damaged by a high current, and each switch may be implemented as a single FET so as not to block the current being charged to the battery pack 2030.

A battery pack 2030 according to an embodiment may be connected in parallel with a reverse current pass circuit 3120. Since the reverse current pass circuit 3120 is connected in parallel with the reverse current pass circuit 3120, when the resistance at both ends of the reverse current pass circuit 3120 is less than or equal to a preset value, the reverse current flows through the reverse current pass circuit 3120 and may not be flow through the battery pack 2030. In the case of a reverse wiring, since resistances at both ends of the reverse current pass circuit 3120 become less than or equal to a preset value, a reverse voltage according to the reverse wiring may not be practically applied to the battery pack 2030. In the case of a reverse wiring, the reverse current flows to the reverse current pass circuit 3120 connected in parallel with the battery pack 2030 even before a cut-off circuit 3110 operates, so the battery pack 2030 can be protected from a reverse wiring.

Specifically, a method of protecting circuits by the reverse wiring protection device 3100 when the solar panel operates as a voltage source or a current source will be described in detail with reference to FIGS. 14 to 16.

Figure 14:
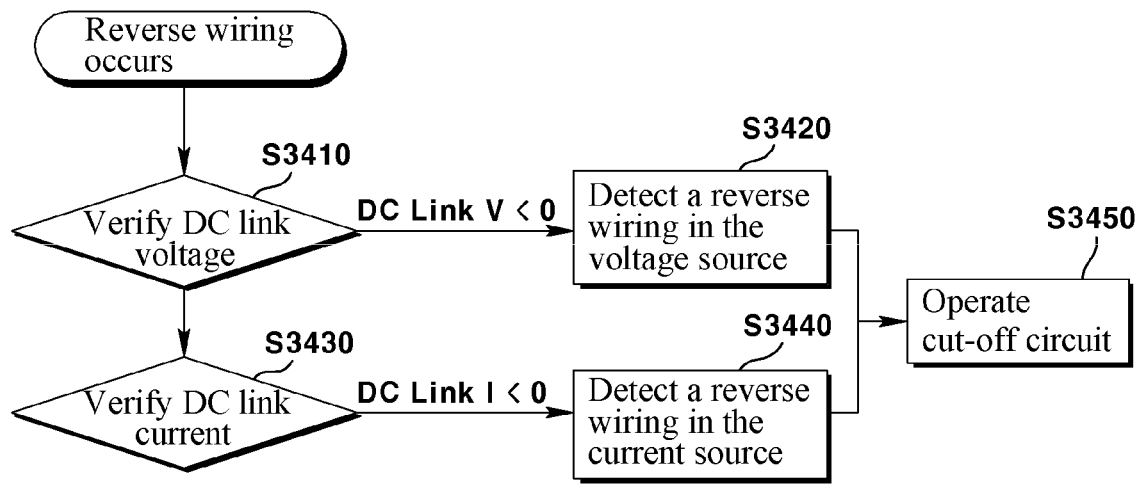
FIG. 14 is a flowchart illustrating an example in which a reverse wiring protection device operates a cut-off circuit according to an embodiment.

FIG. 14 is a flowchart illustrating an example in which a reverse wiring protection device operates a cut-off circuit according to an embodiment.

FIG. 14 is a flowchart illustrating an example in which a reverse wiring protection device operates a cut-off circuit according to an embodiment.

When the voltage of the DC Link is less than 0V (DC Link V<0), proceed to step S3420 to inform the cut-off circuit that a reverse wiring of the voltage source has been sensed. In step S3450, the cut-off circuit of the reverse wiring protection device 3100 operates so that power is not transferred to the battery.

Figure 15:
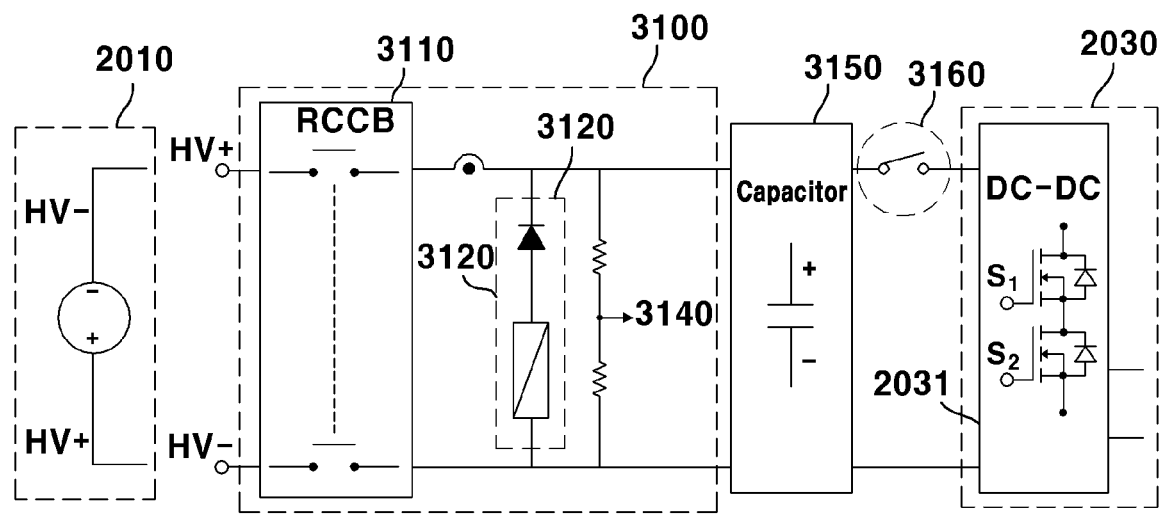
FIG. 15 is a block diagram illustrating an example in which a reverse wiring protection device operates when a solar cell module is a voltage source according to an embodiment.

Specifically, FIG. 15 is a block diagram illustrating an example in which a reverse wiring protection device operates when a photovoltaic module is a voltage source according to an embodiment.

Referring to FIG. 15, a solar panel 2010 according to an embodiment may operate as a voltage source. For example, when the solar panel 2010 is connected to an inverter 2020 in a series-parallel combination, the solar panel 2010 may be seen as a voltage source in a solar power generation system. In this case, when a reverse wiring with the solar panel 2010 is formed, a voltage sensor 3140 may sense whether a reverse wiring has occurred based on a voltage appearing at the input end. Meanwhile, in FIG. 15, a capacitor 3150 is implemented as a remote control circuit breaker (RCB), and when a reverse wiring is sensed, the voltage sensor 3140 can remotely send a signal to a cut-off circuit 3110 to cut-off the power. Of course, it is not necessarily limited to this configuration, and the reverse wiring protection device 3100 may further comprise a control unit for controlling the voltage sensor 3140 and the cut-off circuit 3110.

Referring to FIG. 14 again, in step S3410, when a reverse wiring is not detected in the voltage verification of the DC link, it is proceeded to step S3430 to determine whether the current of the DC link is smaller than OA. When negative current is detected (DC Link I<0), in step S3460, the current sensor determines that a reverse wiring of the current source has been detected. Then, it is proceeded to step S3450 to operate the cut-off circuit.

Meanwhile, in the description of FIGS. 13 and 15, the reverse wiring protection device 3100, the capacitor 3150, and the switch 3160 are illustrated to be disposed at the front end of a DC-DC converter 2031 for convenience of description, but it may be included in the DC-DC converter 2031 to perform a function of protecting a circuit when a reverse wiring occurs.

Figure 16:
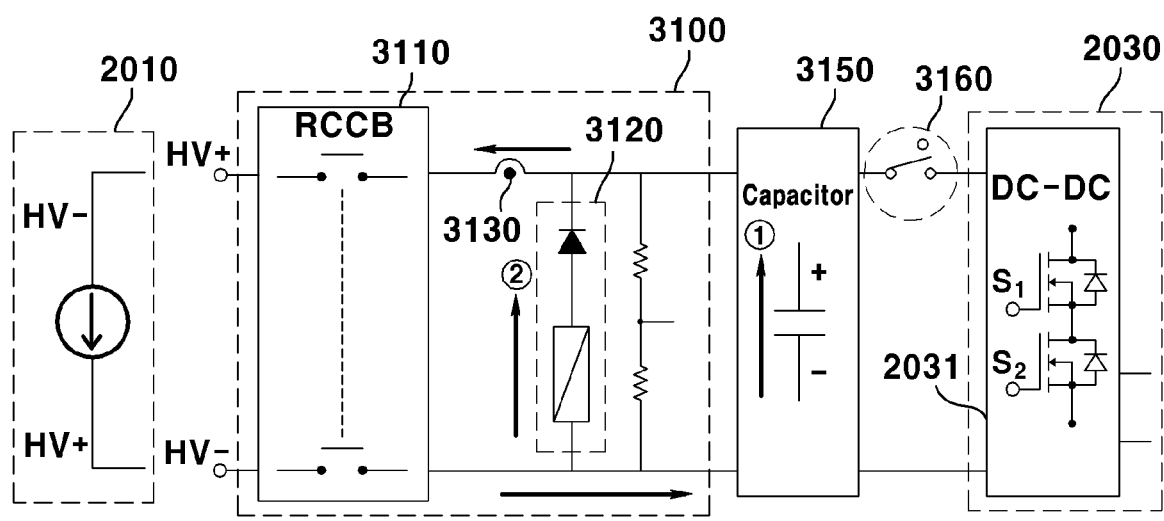
FIG. 16 is a block diagram illustrating an example in which a reverse wiring protection device operates when a solar cell module is a current source according to an embodiment.

FIG. 16 is a block diagram illustrating an example of an operation of a reverse wiring protection device when a photovoltaic module is a current source according to an embodiment.

Referring to FIG. 16, the solar panel 2010 may operate as a current source. For example, when an optimal control method is applied to the output of the solar panel 2010, it is seen as a current source in the related system.

Therefore, when a reverse wiring occurs at the input of the current source, current is charged in the capacitor 3150 of the reverse wiring protection device 3100 in step ①. And in step ②, when the capacitor is fully charged by the current, the current flows in reverse through the reverse current pass circuit 3120. At this time, the current sensor 3130 senses the reverse wiring, and may allow the cut-off circuit 3110 to cut-off the power.

For example, when there is no reverse current pass circuit when a reverse wiring occurs, the reverse current directly flows to the DC-DC converter 2031 because the current sensor 3130 cannot sense the reverse wiring during the time the capacitor 3150 is charged by the current. However, the reverse wiring protection device 3100 according to an embodiment allows current to flow as if the circuit is forcibly shorted through the reverse current pass circuit, so that the reverse current can be prevented from flowing through the DC-DC converter 2031 and the like before the current sensor detects the reverse wiring.

Meanwhile, the above-described reverse wiring protection device 3100 may be switched to a sleep mode by using a switch 3160 connecting the reverse current pass circuit 3120 and the battery pack 2030. For example, the switch 3160 may protect the battery by opening the switch 3160 so that the battery is no longer discharged when the state of charge (SOC) of the battery included in the battery pack 2030 is less than or equal to a preset value.

Figure 17:
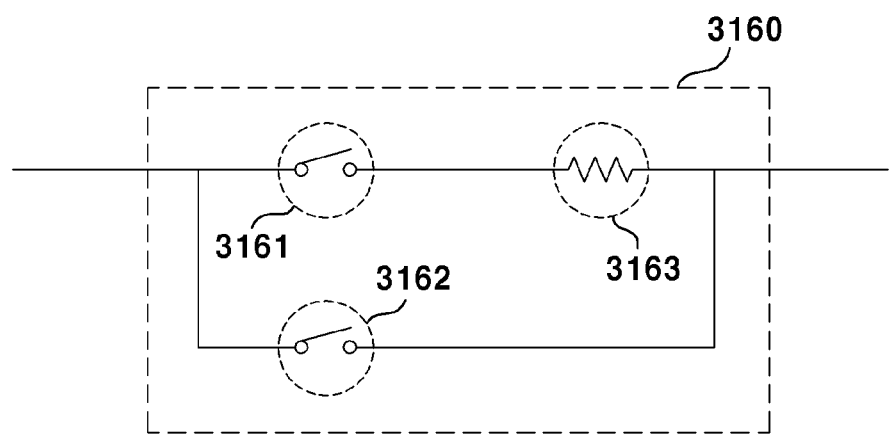
FIG. 17 is a diagram illustrating an example of implementing a switch in a sleep mode according to an embodiment.

Specifically, FIG. 17 is a diagram illustrating an example of implementing a switch 3160 in a sleep mode according to an embodiment.

A switch 3160 according to an embodiment may operate by receiving a control signal. For example, in a sleep mode, the switch 3160 may be opened by receiving a control signal requesting to be opened. As another example, in an operation mode, the switch 3160 may be closed by receiving a control signal requesting to be closed.

Referring to FIG. 17, a switch 3160 according to an embodiment may comprise a first line comprising a first FET 3161 and a resistor 3163 connected in series with the first FET 3161, and a second line connected in parallel with the first line and comprising a second FET 3162.

As illustrated in FIG. 17, when a switch 3160 is configured in two stages, a structure in which the switch 3160 is not damaged by a high current may be provided, and each of the switches 3161 and 3162 can be implemented with one FET so as not to block the current charging the battery pack 2030.

As another example, each of the switches 3161 and 3162 may be implemented as two FETs to pass current discharged from the battery pack 2030. When the switches 3161 and 3162 are implemented with two FETs, the diode directions of each FET may be positioned in the opposite directions.

Such an operation of the switch may be controlled by a reverse wiring protection device 3100 according to an embodiment, and the battery may be prevented from over-discharging. In addition, since a reverse current does not flow by a switch 3160 in a sleep mode, the reverse wiring protection device 3100 can protect circuits of the battery pack when a reverse wiring occurs without operating the cut-off circuit. Further, the reverse wiring protection device 3100 can also optionally decide whether to operate the cut-off circuit 3110 or to operate in a sleep mode by opening the switch 3160 when a reverse wiring occurs or the SOC falls below the preset level.

Figure 18:
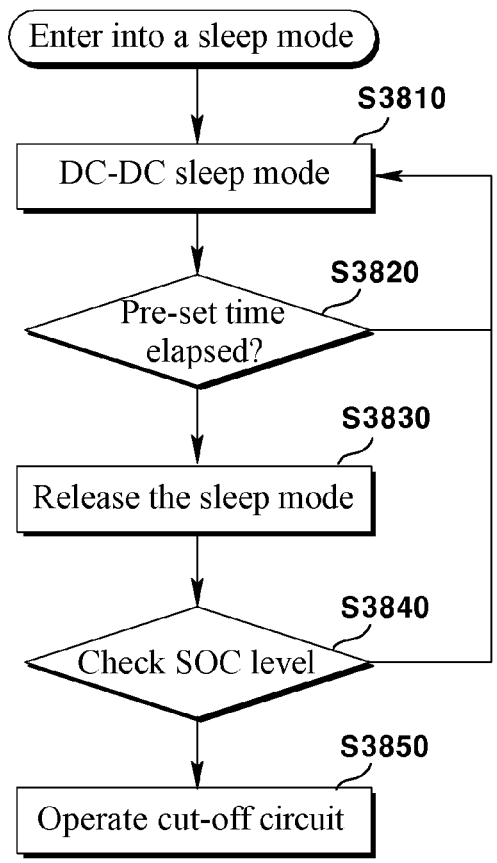
FIG. 18 is a diagram for describing a sleep mode of a battery according to an embodiment.

FIG. 18 is a diagram for describing an operation of a battery in a sleep mode according to an embodiment.

A sleep mode according to an embodiment may be a mode that operates when the SOC of the battery is less than or equal to a preset value in order to prevent excessive discharge of the battery.

In a sleep mode, the switch can be opened so that the battery no longer consumes power. In some cases, by operating in a sleep mode, it is possible to prevent complete discharge of the battery or the maintaining time of the battery can be extended.

Referring to FIG. 18, when the switch is opened and the battery enters into a sleep mode, the reverse connection protection device 3100 can determine whether to maintain the sleep mode or operate the cut-off circuit by checking the SOC level of the battery at each preset time.

In step S3810, the DC-DC converter of the battery pack switches to a sleep mode. According to an embodiment, in order for the DC-DC converter to switch to a sleep mode when the battery charge level falls below a preset value, the switch of the reverse wiring protection device may be opened as described above. Or, the DC-DC converter itself can cut off the power for each module to prevent power consumption. For example, in a sleep mode, it is possible to minimize power consumption of the battery by ending all functions while leaving only the minimum functions of the battery pack. Here, the minimum function may mean a communication function for counting the elapse of a preset time or receiving a sleep mode release signal from the outside.

In step S3820, it is determined whether a preset time has elapsed since the entry into the sleep mode. For example, after entering the sleep mode, the sleep mode may be released by proceeding to step S3830 every two hour intervals.

When the sleep mode is released, the battery management system is temporarily driven in step S3840 to check the SOC level, and it is determined whether to maintain the sleep mode or proceed to step S3850 to operate the cut-off circuit. For example, when the SOC level is lower than when entering into the sleep mode, it is determined that the battery is continuously consumed even in the sleep mode, and the cut-off circuit can be operated. For example, even the current consumed by the switch for maintaining the sleep mode can be minimized by entering into a cut-off mode.

Meanwhile, when the system enters into a power cut-off mode due to the operation of a cut-off circuit of a solar power generation system, an example of predicting the power generation timing of the solar panel and switching back to a sleep mode will be described. According to an embodiment, when the switch 3160 is configured as a two-stage FET, the battery can be charged in a sleep mode. Therefore, it may be desirable to switch from a cut-off mode to a sleep mode when the solar panel generates power.

Figure 19:
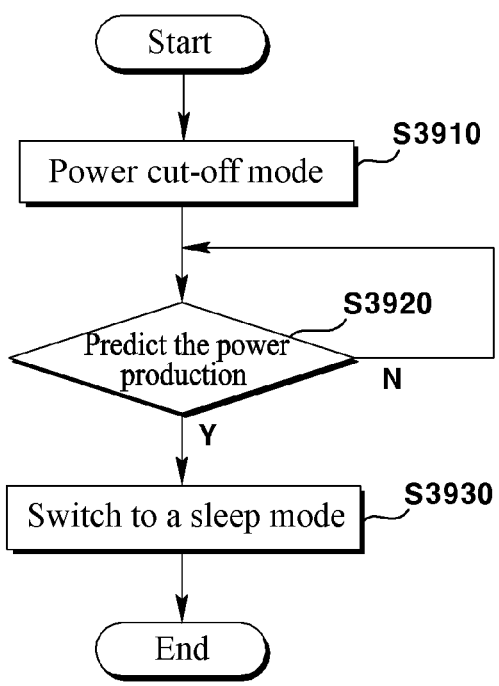
FIG. 19 is a diagram illustrating an example of controlling a cut-off circuit of a solar power generation system based on a change in the amount of sunlight or a change in weather, according to an embodiment.

FIG. 19 is a diagram illustrating an example of controlling a cut-off circuit of a reverse wiring protection device of a solar power generation system based on a change in the amount of the sunlight or a change in weather, according to an embodiment.

Referring to FIG. 19, in step S3910, a cut-off circuit is operated based on the SOC level so that the solar power generation system may enter into a power cut-off mode.

In step S3920, the solar power generation system may predict the amount of electricity generated according to the change in weather and the change in the amount of sunlight based on data collected from the data of Korea Meteorological Administration or a solar panel. For example, when the current time is 7 am and it is predicted that the solar panel will generate power in consideration of the season and the weather, it enters into step S3930 to switch to a sleep mode.

However, when the amount of sunlight is still insufficient and power production is not predicted, it is possible to maintain a power cut-off mode and determine whether power production is predicted at a preset time period. Of course, the solar power generation system can control the DC-DC converter of the battery pack so that the sleep mode is also released when the SOC level rises above a preset value.

Figure 20:
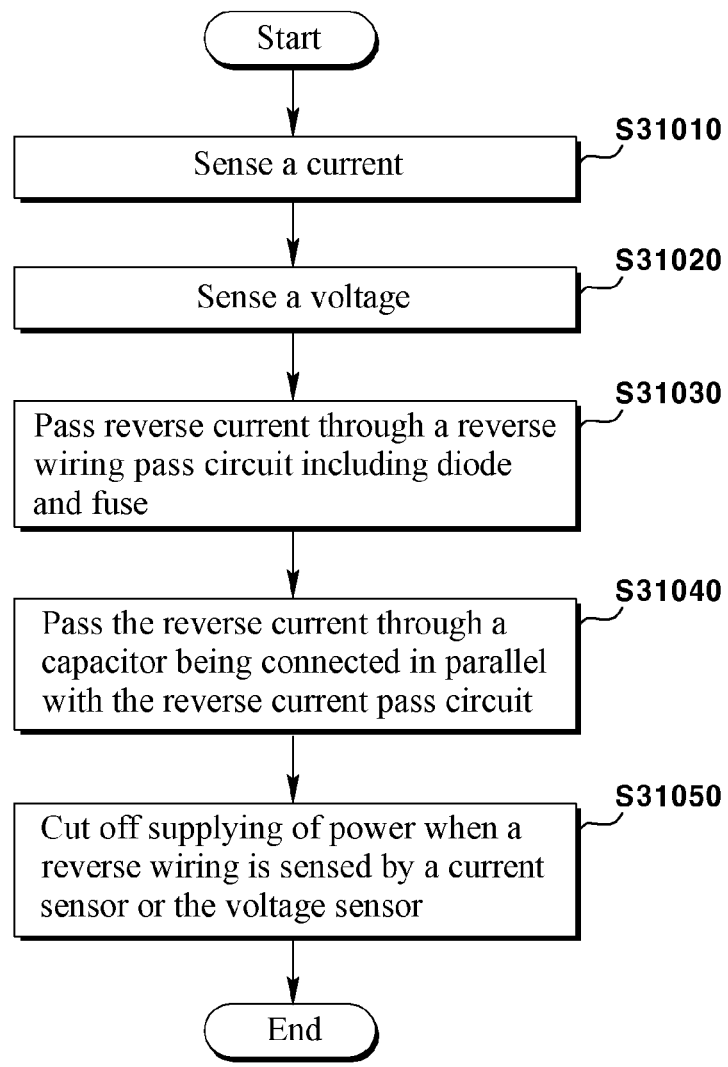
FIG. 20 is a flowchart illustrating a method of controlling a DC-DC converter according to an embodiment.

FIG. 20 is a flowchart illustrating a method of controlling a DC-DC converter according to an embodiment. Referring to FIG. 20, the DC-DC converter control method comprises steps that are processed in time series by a DC-DC converter comprising the reverse wiring protection device 3100 illustrated in FIGS. 13, 15 and 16. Accordingly, it can be seen that the contents described above regarding the reverse wiring protection apparatus 3100 illustrated in FIGS. 13, 15, and 16 are also applied to the method illustrated in FIG. 20 even when omitted hereinafter.

In step S31010, the current sensor senses a current.

In step S31020, the voltage sensor senses a voltage.

Meanwhile, since each sensing method will be used depending on whether the power source is a voltage source or a power source as described above in the description of FIGS. 14 to 16, it is obvious to a person skilled in the art that steps S31010 and S31020 will not be restricted to their order.

In step S31030, when the power source acts as a current source and current flows, the reverse current is passed through a reverse current pass circuit comprising a diode and a fuse. For example, by creating a temporary short condition, flowing of a reverse current through the battery pack is prevented.

In step S31040, the reverse wiring protection method according to an embodiment cuts-off the supply of power when a reverse wiring is sensed by a current sensor or a voltage sensor. Therefore, it is possible to protect the circuit from damages even when a reverse wiring occurs.

Meanwhile, the above-described method can be written as a program that can be executed on a computer, and can be implemented in a general-purpose digital computer that operates the program using a computer-readable recording medium. In addition, the structure of the data used in the above-described method can be recorded on a computer-readable recording medium through various means. The computer-readable recording medium includes storage media such as magnetic storage media (for example, ROM, RAM, USB, floppy disk, hard disk, and the like), optical reading media (for example, CD-ROM, DVD, and the like).

It will be understood by a person of ordinary skill in the art related to the present embodiment that it may be implemented in a modified form within a scope not departing from the essential characteristics of the above description. Therefore, the disclosed methods should be considered from an explanatory point of view rather than a limiting point of view. The scope of the present invention is illustrated in the claims rather than the foregoing description, and all differences within the scope equivalent thereto should be construed as being included in the present invention.

The invention claimed is:

1. A DC-DC converter comprising:
    a current sensor;
    a voltage sensor;
    a reverse current pass circuit comprising a diode and a fuse;
    a cutoff circuit configured to cut-off power supply when a reverse wiring is sensed from the current sensor or the voltage sensor;
    a capacitor connected in parallel with the reverse current pass circuit; and
    a switch connecting the reverse current pass circuit and a battery pack.

2. The DC-DC converter according to claim 1, comprising the battery pack connected in parallel with the reverse current pass circuit.

3. The DC-DC converter according to claim 2, wherein the battery pack comprises a battery and at least one of a converter, a battery management system (BMS), and a battery control circuit.

4. The DC-DC converter according to claim 1, wherein the switch is opened when the battery pack is in a sleep mode.

5. The DC-DC converter according to claim 4, wherein the sleep mode is activated when a state of charge (SOC) of a battery comprised in the battery pack is less than or equal to a preset value.

6. The DC-DC converter according to claim 5, wherein the sleep mode is deactivated after a preset time interval.

7. The DC-DC converter according to claim 1, wherein the switch comprises a first line comprising a first FET and a resistor connected in series with the first FET, and a second line connected in parallel with the first line and comprising a second FET.

8. The DC-DC converter according to claim 1, wherein the capacitor passes a reverse current according to the reverse wiring in parallel with the reverse current pass circuit.

9. The DC-DC converter according to claim 1, wherein the diode is disposed in a direction in which the reverse current can flow.

10. The DC-DC converter according to claim 1, wherein the capacity of the fuse corresponds to the rated power applied to the DC-DC converter.

11. The DC-DC converter according to claim 1, wherein the current sensor determines whether it is a reverse wiring based on an amount of change per time of a magnitude of current.

12. The DC-DC converter according to claim 1, wherein the voltage sensor determines whether it is a reverse wiring based on an amount of change per time of a magnitude of voltage.

13. A control method of a DC-DC converter comprising:
sensing a current by a current sensor;
sensing a voltage by a voltage sensor;
passing a reverse current through a reverse current pass circuit comprising a diode and a fuse;
passing the reverse current through a capacitor connected in parallel with the reverse current pass circuit; and
cutting off power supply when a reverse wiring is sensed from the current sensor or the voltage sensor.

14. The control method of a DC-DC converter according to claim 13, comprising opening a switch connecting the reverse current pass circuit and a battery pack when the battery pack is in a sleep mode.

15. The control method of a DC-DC converter according to claim 14, wherein the battery pack is connected in parallel with the reverse current pass circuit, circuit.

16. The control method of a DC-DC converter according to claim 14, comprising activating a sleep mode is when a state of charge (SOC) of a battery comprised in the battery pack is less than or equal to a preset value.

17. The control method of a DC-DC converter according to claim 16, comprising deactivating after a preset time interval.

18. The control method of a DC-DC converter according to claim 13, comprising determining whether it is a reverse wiring based on an amount of change per time of a magnitude of current by the current sensor.

19. The control method of a DC-DC converter according to claim 13, comprising determining whether it is a reverse wiring based on an amount of change per time of a magnitude of voltage by the voltage sensor.

20. A DC-DC converter comprising:
a reverse current pass circuit;
a cutoff circuit configured to cut-off power supply when a reverse wiring is sensed;
a capacitor connected in parallel with the reverse current pass circuit; and
a switch connecting the reverse current pass circuit and a battery pack.

* * * * *